United States Patent
Antonenko et al.

[11] Patent Number: 6,051,439
[45] Date of Patent: Apr. 18, 2000

[54] METHODS FOR PARALLEL SYNTHESIS OF ORGANIC COMPOUNDS

[75] Inventors: Valery V. Antonenko, Cupertino; Nicolay V. Kulikov, Redwood City, both of Calif.

[73] Assignee: Glaxo Wellcome Inc., Research Triangle Park, N.C.

[21] Appl. No.: 08/947,476

[22] Filed: Oct. 10, 1997

Related U.S. Application Data

[63] Continuation-in-part of application No. 08/736,317, Oct. 23, 1996.

[51] Int. Cl.[7] .................................. B01L 1/02; B01L 7/00
[52] U.S. Cl. .......................... 436/178; 422/99; 422/101; 435/297.1; 435/297.5; 436/89; 436/174
[58] Field of Search ...................................... 436/174, 178; 436/89; 422/99, 101; 435/297.1, 297.5

[56] References Cited

U.S. PATENT DOCUMENTS

| | | |
|---|---|---|
| 4,111,754 | 9/1978 | Park . |
| 4,493,815 | 1/1985 | Fernwood et al. . |
| 4,526,690 | 7/1985 | Kiovsky et al. . |
| 4,598,049 | 7/1986 | Zelinka et al. . |
| 4,894,343 | 1/1990 | Tanaka et al. . |
| 4,948,442 | 8/1990 | Manns . |
| 5,047,215 | 9/1991 | Manns . |
| 5,108,704 | 4/1992 | Bowers et al. . |
| 5,147,608 | 9/1992 | Hudson et al. . |
| 5,183,744 | 2/1993 | Kawamura et al. . |
| 5,186,844 | 2/1993 | Burd et al. . |
| 5,219,528 | 6/1993 | Clark . |
| 5,272,081 | 12/1993 | Weinreb et al. . |

(List continued on next page.)

FOREIGN PATENT DOCUMENTS

| | | |
|---|---|---|
| 1 304 916 | 7/1992 | Canada . |
| 0 403 679 | 12/1990 | European Pat. Off. . |
| 0 787 527 | 8/1997 | European Pat. Off. . |
| 196 02 464 | 7/1997 | Germany . |
| 1 509 826 | 5/1978 | United Kingdom . |
| WO 90/02605 | 3/1990 | WIPO . |
| WO91/07504 | 5/1991 | WIPO . |
| WO 92/02303 | 2/1992 | WIPO . |
| WO 94/06902 | 3/1994 | WIPO . |
| WO94/05394 | 3/1994 | WIPO . |

(List continued on next page.)

OTHER PUBLICATIONS

This reference is a picture of HP 7686 Solution–Phase Synthesizer by Hewlett Packard.
This reference is a picture of a MultiReactor™ Synthesizer by RoboSynthon, Inc.
This reference is a picture of a Stem Reacto–Stations™ Synthesizer by Stem Coporation.
This reference is a picture of an RS 1000 with air–cooled reflux module.
This reference is a picture of a RAM™ Synthesizer.
This reference is a picture of a Nautilus™ 2400 Synthesizer by Argonaut Technologies, Inc.
This reference is a picture of a Model 496 Multiple Organic Synthesizer by Advanced Chem Tech.

(List continued on next page.)

*Primary Examiner*—Jan Ludlow
*Attorney, Agent, or Firm*—Darin J. Gibby; Lauren L. Stevens

[57] ABSTRACT

The invention provides a method for synthesizing various chemicals onto solid supports, cleaving the synthesized compounds and preparing samples for analysis. In one exemplary embodiment, the invention provides a device comprising a housing which defines an enclosure. A plate having a plurality of wells is received into the enclosure. Each of the wells has a bottom end and at least some of the wells have a hole in the bottom end. A pressure source is in fluid communication with the holes in the bottom ends of the wells. In this manner, a fluid may be maintained within the wells by application of pressure from the pressure source.

17 Claims, 22 Drawing Sheets

U.S. PATENT DOCUMENTS

| | | |
|---|---|---|
| 5,273,718 | 12/1993 | Skoüld et al. . |
| 5,288,464 | 2/1994 | Nokihara . |
| 5,308,757 | 5/1994 | Kawamura et al. . |
| 5,324,483 | 6/1994 | Cody et al. . |
| 5,355,686 | 10/1994 | Weiss . |
| 5,384,261 | 1/1995 | Winkler et al. . |
| 5,457,527 | 10/1995 | Manns et al. . |
| 5,472,672 | 12/1995 | Brennan . |
| 5,503,805 | 4/1996 | Sugarman et al. . |
| 5,506,141 | 4/1996 | Weinreb et al. . |
| 5,516,491 | 5/1996 | Kath et al. . |
| 5,529,756 | 6/1996 | Brennan . |
| 5,565,324 | 10/1996 | Still et al. . |
| 5,585,275 | 12/1996 | Hudson et al. . |
| 5,599,688 | 2/1997 | Grass . |
| 5,604,130 | 2/1997 | Warner et al. . |
| 5,609,826 | 3/1997 | Cargill et al. . |
| 5,620,894 | 4/1997 | Barger et al. . |
| 5,622,699 | 4/1997 | Ruoslahti et al. . |
| 5,639,428 | 6/1997 | Cottingham . |
| 5,650,489 | 7/1997 | Lam et al. . |
| 5,665,975 | 9/1997 | Kedar . |
| 5,688,696 | 11/1997 | Lebl . |
| 5,712,171 | 1/1998 | Zambias et al. . |
| 5,725,831 | 3/1998 | Reichler et al. . |
| 5,770,157 | 6/1998 | Cargill et al. . |
| 5,792,430 | 8/1998 | Hamper . |
| 5,888,830 | 3/1999 | Mohan et al. . |

FOREIGN PATENT DOCUMENTS

| | | |
|---|---|---|
| WO94/14972 | 7/1994 | WIPO . |
| WO95/01559 | 1/1995 | WIPO . |
| WO 95/11262 | 4/1995 | WIPO . |
| WO96/03212 | 2/1996 | WIPO . |
| WO96/16078 | 5/1996 | WIPO . |
| WO 96/30761 | 10/1996 | WIPO . |
| WO 96/33010 | 10/1996 | WIPO . |
| WO96/42004 | 12/1996 | WIPO . |
| WO97/06890 | 2/1997 | WIPO . |
| WO 97/10896 | 3/1997 | WIPO . |
| WO97/09353 | 3/1997 | WIPO . |
| WO97/42216 | 11/1997 | WIPO . |
| WO 97/45443 | 12/1997 | WIPO . |
| WO97/45455 | 12/1997 | WIPO . |
| WO98/05424 | 2/1998 | WIPO . |
| WO98/06490 | 2/1998 | WIPO . |
| WO98/08092 | 2/1998 | WIPO . |

OTHER PUBLICATIONS

This reference is a picture of MicroKans® and Microtubes® by IRORI. These are used in an AccuTag®100 Combinatorial Chemistry System by IRORI.

This reference is a picture of an AutoSort®–10K Microreactor Sorting System by IRORI.

This reference is a picture of SOPHAS M Solid Phase Synthesizer by Zinsser Analytic.

This reference is a picture of a Quest 210 Synthesizer by Argonaut Technolgies.

This refers to pictures of an APOS 1200 Synthesizer by Rapp Polymere GmbH.

Baiga (1998), "Integrated Instrumentation for High–Throughput Organic Synthesis," Presented at Cambridge Healthtech Institute's Third Annual Symposium "High–Throughput Organic Synthesis", Mar. 5–6, Coronodo, California.

Baldwin et al. (1995), "Synthesis of a Small Molecule Library Encoded with Moelcular Tags," J. Am. Chem. Soc. 117:5588–5589.

Bergot (1998), "Combinatorial Chemistry Workstation to Facilitate Pharmaceutical Development," Presented at Cambridge Healthtech Institute's Third Annual Symposium "High–Throughput Organic Synthesis", Mar. 5–6, Coronodo, California.

Brenner and Lerner (1992), "Encoded combinatroial chemistry," Proc. Natl. Acad. Sci. U.S.A. 89:5381–5383.

Campbell (1998), "Automating Solid–Phase Synthesis without Compromise," Presented at Cambridge Healthtech Institute's Third Annual Symposium "High–Throughput Organic Synthesis," Mar. 5–6, Coronodo, California.

Cargill et al. (1995), "Automated Combinatorial Chemistry on Solid Phase," Proceedings of the International Symposium on laboratory Automation and Robotics 1995. Zymark Corporation, Zymark Center, Hopkinton, MA, pp. 221–234.

Cargill et al. (1996), "Automated Combinatorial Chemistry on Solid Phase," Laboratory Robotics and automation, 8:139–148.

Czarnik, A.W. (1997) No static at all: using radiofrequency memory tubes without (human) interference. Abstract at the Association for Laboratory Automation Labautomation'97 Conference, 1997 Jan. 18–22, San Diego. On the World Wide Web URL http://labautomation.org.

Czarnik and Nova (1997), "No static at all." Chemistry in Britain, Oct., pp. 39–41.

Daniels et al. (1990, "Membranes as novel solid supports for peptide synthesis," Peptides, Proceedings of the Eleventh American Peptide Symposium Jul. 9–14, 1998 (Rivier and Marshall, eds.), pp. 1027–1028.

DeWitt et al. (1996), "Combinatorial Organic Synthesis Using Park–Davis Diversomer Method," Acc. Chem. Res. 29:114–122.

DeWitt et al. (1994), "Diversomer Technology: solid phase synthesis, automation, and integration for the generation of chemical diversity," Drug Dev. Res. 33:116–124.

DeWitt et al. (1996), "A modular System for combinatorial and Automated Synthesis" in Molecular Diversity and Combinatorial Chemistry: Libraries and Drug Discovery. ACS Conference Proceedings Series (Chaiken and Janda Eds.) pp. 207–218. American Chemical Society, Washington DC.

DeWitt et al. (1995), "Automated synthesis and combinatorial chemistry," current Opinion in Biotechnology 6:640–645.

DeWitt et al. (1993), "Diversomers": An approach to non-peptide, nonoligomeric chemical diversity. Proc. Natl. Acad. Sci. U.S.A. 90:6909–6913.

Floyd et al. (1997), "The Automated Synthesis of Organic Compunds—some Newcomers have Some Success" in "Proceedings of the International Symposium on Laboratory Automation and Robotics 1996" pp. 51–76. Zymark Corporation, Zymark Center, Hopkinton, MA.

Frank (1994), "Spot–synthesis: An easy and flexible tool to study molecular recognition," Innovation and Perspectives in Solid Phase Synthesis, (Epton, ed.), pp. 509–512.

Frank et al. (1988), "Simultaneous multiple peptide synthesis under continuous folw conditions on cellulose paper discs as segmental solid supports," Tetrahedron 44:6031–6040.

Furka et al. (1991), "General method for rapid synthesis of multicomponent peptide mixtures," Int. J. Pept. Protein Res. 37:487–493.

Gooding et al. (1996), "Boosting the Productivity of Medicinal Chemistry Through Automation Tools, Novel Technological Developments Enable a Wide Range of Automated Synthetic Procedures" in "Molecular Diversity and Combinatorial chemistry: Libraries and Drug Discovery. ACS Conference Proceedings Series"(Chaiken et al.) pp. 199–206. American Chemical Society, Washington, DC.

Harness (1996), "Automation of High–Throughput Synthesis. Automated Laboratory Workstations Designed to Perform and Support Combinatorial Chemistry" in "Molecular Diversity and Combinatorial Chemistry: Libraries and Drug Discovery. ACS Conference Proceedings Series" (Chaiken et al.) pp. 188–198. American Chemical Society, Washington, DC.

Kerr et al. (1993), "Encoded combinatorial peptide libraries containing non–natural amino acids," J. Am. Chem. Soc. 115:2529–2531.

Lam et al. (1991), "A new type of synthetic peptide library for identifying ligand–binding activity," Nature (London), 354:82–84.

Lashkari et al. (1995), "An automated multiplex oligonucleotide synthesizer: Development of high–throughput, low–cost DNA synthesis," Proc. Natl. Acad. Sci. USA 92:7912–7915.

Lebl et al. (1995), "One–bead–one–structure combinatorial libraries," Biopolymers, 37:177–198.

Meyers et al., "Multiple simultaneous synthesis of phenolic libraries," ESCOM Science Publishers B.V., Leiden, The Netherlands, Copyright 1995, Mol. Diversity, 1:13–20.

Meyers et al. (1996), "Versatile method for parallel synthesis," Methods Mol. Cell. Biol. (1996), 6:67–73.

Mjalli (1997), "Application of Automated Parallel Synthesis" in "A Practical Guide to Combinatorial Chemistry" (Czarnik et al.) pp. 327–354. American Chemical Society, Washington, DC.

Moran et al. (1995), "Radio Frenquency Tag Encoded Combinatorial Library Methods for the Discovery of Tripeptide–Substituted Cinnamic Acid Inhibitors of the protein Tyrosine Phosphatase PTP1B," J. Am. Chem. Soc. 117:10787–10788.

Nakazawa (1994), "Chapter 20. The anisotropic principle," in Principles of Precision Engineering, Oxford University Press, pp. 212–228.

Nestler et al. (1994), "A General Method for Molecular Taggin of Encoded Combinatorial Chemistry Libraries," J. Org. Chem. 59:4723–4724.

Ni et al. (1996), "Versatile Approach to Encoding combinatorial Organic Syntheses Using Chemically Robust Secondary Amine Tags," J. Med. Chem. 39:1601–1608.

Nicolau et al. (1995), "Radiofrequencey encoded combinatorial chemistry," Angew. Chem. Int. Ed. 34:2289–2291.

Nielsen et al. (1993), "Synthetic methods for the implementation of encoded combinatorial chemistry," J. Am. Chem. Soc. 115:9812–9813.

Nikolaev et al. (1993), "Peptide–encoding for structure determination of nonsquenceable polymers within libraries synthesized and tested on solid–phase supports," Pept. Res. 6:161–170.

Ohlmeyer et al. (1993), "Complex synthetic chemical libraries indexed with molecular tags," Proc. Natl. Acad. Sci. U.S.A. 90:10922–10926.

Porco et al. (1998), "Automated chemical synthesis: chemistry development on the Nautilus 2400TM," Drugs of the Future 23:71–78.

Powers et al. (1998), "Personal Synthesizer for HTS," Genetic Eng. News, 18, No. 3, p. 14.

Rivero et al. (1997), "Equipment for the High–Throughput Organic Synthesis of Chemical Libraries" in "A Practical Guide to combinatorial chemistry" (Czarnik et al.) pp. 281–307. American Chemical Society, Washington, DC.

Salmon et al. (1993), "Discovery of biologically active peptides in random libraries: solution–phase testing after staged orthogonal release from resin beads," Proc. Natl. Acad. Sci. U.S.A. 90:11708–11712.

Stanchfield (1997), "FlexChem TM: A Modular System for High Throughput Synthesis of Small Molecules," Robbins Innovations, 5, No. 4, pp. 1–6.

Stanchfield (1998), "A Flexible, Modular System for Performing High–Throughput Synthesis of Small Moelcules," Presented at Cambridge Healthtech Institute's Third Annual Symposium "High–Throughput Organic Synthesis", Mar. 5–6, Coronado, California.

Terrett et al. (1997), "Drug discovery by combinatorial chemistry—The development of a novel method for the rapid synthesis of single compounds," Chem. Eur. J. 3:1917–1920.

Veldkamp and McHugh (May 1992), "Binary Optics," Scientific American, pp. 92–97.

Whitten et al. (1996), "Rapid Microscale Synthesis, a New Method for Lead optimization Using Robotics and Solution Phase Chemistry: Application to the Synthesis and Optimization of Corticotropin–Releasing Factor Receptor Antagonists," J. Med. Chem. 39:4354–4357.

Brochure, "Millipore MultiScreen Assay System," Millipore Corporation, Bedford, MA 01730, Rev. B 9/91,14 pages.

Lashkari et al. (1995), Proc. Natl. Acad. Sci. USA 92:7912–7915, "An automated multiplex oligonucleotide synthesizer: Development of high–throughput, low–cost DNA synthesis".

Multiblock—Instrument for multiple and combinatorial synthesis—Brief Description and User's Manual, 5 pages.

Meyers et al., "Multiple simultaneous synthesis of phenolic libraries," ESCOM Science Publishers B.V., Leiden, The Netherlands, Copyright 1995, 16 pages.

Product Brochure for a reaction block for "Combinatorial Chemistry," by SyRo, 1 page.

Product Brochure, "Alchemy 2000 Automated Reaction System," Sagian Incorporated, 3 pages.

METHODS FOR PARALLEL SYNTHESIS OF ORGANIC COMPOUNDS

CROSS REFERENCE TO RELATED APPLICATIONS

This application is a continuation in part application of U.S. application Ser. No. 08/736,317, filed Oct. 23, 1996, the complete disclosure of which is herein incorporated by reference.

BACKGROUND OF THE INVENTION

The invention relates generally to the field of chemical synthesizers. More particularly, the invention provides devices, systems and methods for synthesizing various diverse chemical products onto solid supports, such as beads, cleaving the synthesized compounds from the beads and preparing samples for analysis.

Diverse chemical products find a wide variety of uses, such as in drug discovery, genetic studies and the like. Exemplary diverse chemical products that are useful in scientific studies include peptides, oligonucleotides, and other related materials.

The creation and analysis of diverse chemical products typically proceeds by synthesizing diverse collections of molecules onto a plurality of solid supports, such as beads. For many applications, it is desirable to simultaneously synthesize a wide variety of compounds onto the beads in a high throughput mode. In this manner, numerous compounds may be simultaneously synthesized in a single process, commonly referred to as parallel synthesis. To do so, a variety of synthesizers and techniques have been proposed, such as, for example, those described in copending U.S. application Ser. Nos. 08/146,886, filed Nov. 2, 1993, (Attorney Docket No. 16528-000730), and Ser. No. 08/722,657, filed Sep. 27, 1996, (Attorney Docket No. 16528A-022300), the disclosures of which are herein incorporated by reference.

During the process of synthesis, the beads (which are typically held within a well) are exposed to various liquids. For example, a typical process proceeds by exposing the beads to various reagents. Following this step, the beads are washed several times with a washing solution. Unfortunately, the introduction and removal of such liquids to and from the wells can be extremely time consuming and labor intensive. After the compounds have been synthesized, the compounds are usually cleaved from the beads, organized into samples and analyzed. Such steps are also time consuming and labor intensive since cleavage typically requires a cleavage solution to be introduced into the wells. Following cleavage, the removed compounds must then be organized into sample wells for analysis.

If is often preferable to transfer the cleaved compounds into the wells standard sized microtiter plates because such plates may then be used with most commercially available handling and processing equipment. For example, most automated plate readers, some speed vacuum concentrators, autosamplers, robotics liquid handling equipment, and the like require the samples to be placed into standard sized microtiter plates. However, the time and labor required to manually place samples into such plates can be extensive and considerably slow the process. Hence, the time required for actual synthesis of the compounds onto the beads is minimal compared to the other steps in the overall process, e.g., the introduction and removal of various liquids and chemicals to and from the reaction wells, the transfer of the cleaved compounds into sample wells, and the like.

Another important aspect of the synthesis process is the temperature of the reagents during their exposure to the beads. For example, in some cases it will be desirable to synthesize the compounds at controlled temperatures which are well above or well below room temperature. It may also be desirable in some cases to vary the temperature of the reagents in a controlled manner during synthesis. However, controlling the temperature in this manner can be difficult and challenging.

Therefore, it would be desirable to provide systems, devices and methods which would reduce the amount of time and labor required to complete such steps when simultaneously synthesizing large numbers of diverse compounds onto beads. It would be particularly desirable if such systems, devices and methods allowed for synthesis to occur using standard filling equipment so that the time and labor required to introduce and remove various liquids would be reduced. For example, it would be beneficial if standard multi-channel pipette systems or automated fluid delivery systems could be employed to introduce the various liquids into the reaction wells. It would also be desirable if the cleaved compounds could rapidly and efficiently be placed into the wells of standard sized microtiter plates so that the samples could be rapidly evaluated with commercially available handling and processing equipment. It would further be desirable to provide ways to control the temperature of the reagents during synthesis to provide for a wider assortment of synthesized compounds.

SUMMARY OF THE INVENTION

The invention provides systems, devices and methods for efficiently synthesizing various diverse chemical compounds onto solid supports, cleaving the synthesized compounds from the solid supports, and placing the cleaved compounds into the wells of standard size microtiter plates so that commercially available analyzation equipment may be employed to rapidly and efficiently analyze the compounds. In one exemplary embodiment, the invention provides a device for processing articles, such as solid supports, which comprises a housing defining an enclosure. A plate having a plurality of wells is received into the enclosure. Each well includes a bottom end, with at least some of the bottom ends having a hole extending therethrough. A pressure source is placed in fluid communication with the holes in the bottom ends of the wells to maintain the fluid within the wells by application of pressure from the pressure source.

The device preferably further includes a vacuum source which is also in fluid communication with the holes in the bottom ends of the wells to assist in transferring fluids from the wells by application of negative pressure from the vacuum source. In one exemplary aspect, a seal is provided between the plate and the housing such that the housing and the seal define a manifold. With this arrangement, the pressure and vacuum sources are operably connected to an opening in the manifold so that the fluid may be maintained within or transferred from the wells by applying positive or negative pressure to the manifold. Preferably, the pressure source comprises a source of inert gas which is introduced into the manifold and equally distributed to the bottom ends of the wells.

In some cases, the inert gas will tend to bubble through the fluid contained within the wells. Hence, in one particular aspect, a pressure regulator is operably connected to the pressure source so that a generally constant pressure may be maintained at the bottom ends of the wells. In this manner, the fluids will not leak through the bottom ends of the wells, even when the inert gas bubbles through the fluids in the wells.

In another particular aspect, the housing comprises a top half and a bottom half which mate together to form the enclosure. With this arrangement, the seal preferably comprises a resilient gasket which at least partially sits between the top half and the bottom half. In this manner, the housing compresses the seal which in turn causes the seal to expand against the plate.

In still another aspect, the plate includes ninety-six wells so that it will be compatible with commercially available filling and processing equipment. For example, configuration of the plate in this manner allows for various liquids to be introduced into the wells using multi-channel pipettes or other automated filing equipment which are compatible with the 96-well format. In yet another aspect, a frit is disposed within at least some of the wells so that the solid supports onto which the chemical compounds are synthesized may be suspended within the wells. Preferably, the frits comprise teflon screens.

In yet another aspect, the manifold includes a bottom section which is tapered toward the opening. The tapered section assists in draining fluids through the opening following synthesis and washing. In another particular aspect, the housing includes an aperture in the top plate for providing access to the wells. A lid is preferably provided for covering the aperture. The lid is advantageous in that it captures the inert gasses bubbled through the fluids to produce a generally inert atmosphere during synthesis.

Optionally, a second or bottom plate may be provided and will be configured to be stacked below the first or top plate. In this manner, when the combined plates are placed into the enclosure the synthesized compounds may be cleaved from the solid supports and drained into the bottom plate where they will be available for subsequent analysis.

The invention further provides an exemplary system for processing articles, such as solid supports, onto which various compounds are to be synthesized. The system comprises a synthesizing device comprising a first housing defining a first enclosure. A cleaving device is also provided and comprises a second housing defining a second enclosure. The system further includes a first plate having a plurality of wells, with each well having a bottom end, and with at least some of the wells having a hole in the bottom end. A second plate is further provided and includes a plurality of wells. The plates are configured so that the first plate may be placed on top of the second plate to allow fluids from the top plate to drain into the wells of the second plate. With this arrangement, the synthesizing device enclosure may be configured to receive the first plate so that compounds can be synthesized onto solid supports when in the synthesizing device. Following synthesis, the first plate may be removed from the synthesizing device and stacked on top of the second plate. The combined plates may then be placed into the cleaving device so that the compounds may be cleaved from the solid supports held within the first plate and drained into the second plate. Following cleavage, the second plate may be placed into commercially available process and analyzation equipment for analysis of the various compounds.

The invention still further provides an exemplary method for synthesizing compounds. According to the method, a plate is provided having a plurality of wells. At least some of the wells have a hole in the bottom end, and a frit is disposed in at least some of the wells. A plurality of solid supports are placed into the wells and an inert gas is applied to the bottom ends of the wells. At least one reagent is introduced into the wells, with the reagent being held within the wells by the positive pressure of the inert gas. Following synthesis, application of the positive pressure is ceased and the reagent is drained from the wells through the holes in the bottom end.

In one exemplary aspect, the draining step comprises applying a vacuum to the bottom ends of the wells. Following removal of the reagent, a washing solution is preferably introduced into the wells while positive pressure is reapplied with the inert gas to maintain the washing solution in the wells. Following washing, the washing solution is drained from the wells through the holes in the bottom end.

In another aspect of the method, a cleaving solution is introduced into the wells after the solid supports have been washed. Positive pressure is preferably applied with the inert gas to maintain the cleaving solution within the wells. Preferably, the cleaving solution will be drained from the wells into the wells of a second plate which is positioned below the first plate. A vacuum may be applied to the bottom ends of the wells of the first plate when the second plate is positioned below the bottom ends of the first plate to assist in draining the cleaved compounds. Following cleavage, assays are preferably performed on the solutions in the wells of the second plate. Preferably, the plates will be standard sized so that they will be compatible with commercially available filling and analyzation equipment. In this way, the wells may be rapidly filled with the necessary chemical solutions, and the cleaved compounds may be rapidly prepared into samples and analyzed using conventional equipment.

In another exemplary embodiment, the invention provides a chemical synthesizing device which comprises a reaction block having a top end, a bottom end, and a plurality of reaction chambers between the top end and the bottom end. One or more heat transfer members is provided to selectively add heat to or remove heat from the reaction vessel block. A pressure source is further provided to apply positive pressure to the chambers at the bottom end so that fluids may be maintained within the chambers by application of positive pressure.

In one exemplary aspect, the heat transfer member is configured to remove heat from the reaction block to cool the temperature of the reaction block to at least −20 degrees C. Preferably the heat transfer member will comprise a plurality of Peltier devices to cool the reaction block. In some instances, it will be desirable to cool the reaction block to at least −100 degrees C. In such cases, the heat transfer member may further include a frozen substance which is placed in close proximity to the reaction vessel block. The synthesizing device preferably further includes heat transfer members which are configured to add heat to the reaction block to heat the block to a temperature in the range from about 20 degrees C. to about 200 degrees C. Exemplary heaters comprise resistive heaters.

In still another aspect, a base member is provided into which the reaction vessel block is received. The base member in combination with the reaction block define a manifold, and the pressure source is in communication with the manifold to apply pressure to the chambers. With this configuration, the heat transfer member is preferably in thermal communication with the base member. In another aspect, the reaction block is constructed of aluminum to facilitate heat transfer.

In still another aspect, the base member has a tapered bottom end and a first opening at an apex of the bottom end to drain fluids from the manifold. At least one vacuum source is in communication with the manifold to apply negative pressure to the manifold. Preferably, the manifold further includes a second opening which is vertically above the first opening. The vacuum source is also in communication with the second opening. In this way, valves associated with the first and second opening may be operated to control application of negative pressure to the first and second openings. Such an arrangement is advantageous in that a vacuum may be applied at the second opening to drain liquids from the wells and into the manifold. The vacuum may then be applied at the first opening (at the apex) to drain the fluids from the manifold. In this way, a two-step process is employed so that sufficient suction may be created to drain the fluids from the wells and then to remove the drained fluids from the system.

In still another aspect, a housing is further provided into which the reaction block and base member are received. The housing is configured to seal the reaction block and the base member from the external environment. In this way, the housing may be filled with an inert gas to protect the synthesizing process from contaminants. In yet another aspect, a condenser is provided and is positioned over a top end of the reaction block to collect and condense vapors from the reaction vessels. Such a condenser preferably comprises a plurality of collection vessels which are aligned with the reaction vessels of the reaction block. Further, each reaction vessel and collection vessel are preferably aligned with a continuous piece of a liner material, such as polytetrafluoroethylene.

The invention still further provides an exemplary method for synthesizing compounds. According to the method, a reaction block is provided having a top end, a bottom end, and a plurality reaction vessels between the top end and the bottom end. A plurality of solid supports are introduced into the reaction chambers, and positive pressure is applied with an inert gas to the bottom end. At least one reagent is introduced into the reaction chambers, with the reagent being held within the reaction chambers by application of the positive pressure. The temperature of the reaction block is altered to bring the reaction block within a desired temperature range. In this way, synthesis may occur within a specified temperature range or ranges.

In one aspect, the temperature of the reaction block is periodically varied while the reagents are within the reaction vessels. Alternatively, the temperature may be held constant within the desired range throughout the entire process.

In one aspect, heat will preferably be added to the reaction block to heat the block to a temperature within the range from about 20 degrees C. to about 200 degrees C. Alternatively, heat may be removed from the reaction block to cool the block to a temperature within the range from about 20 degrees C. to about −100 degrees C., although in some instances the temperature may need to be reduced only to about −20 degrees C.

In still another aspect, application of the positive pressure is ceased and the reagent is drained from the bottom end of the reaction block. Draining of the reaction block preferably proceeds by applying negative pressure to the bottom end. The reagent is preferably drained into a tapered manifold which includes an opening in a bottom end. Following draining of the reagent into the manifold, negative pressure is then applied to the manifold to remove the reagents from the manifold.

In yet another aspect, a frit is disposed in at least some of the chambers, and the solid supports are placed into the frits.

Optionally, a blanket of an inert gas may be provided over the top end. In another alternative, the reaction block may be enclosed from the outside environment. In still another aspect, the pressure applied to the bottom end is preferably monitored at or near the bottom end.

DETAILED DESCRIPTION OF THE SPECIFIC EMBODIMENTS

Figure 1:
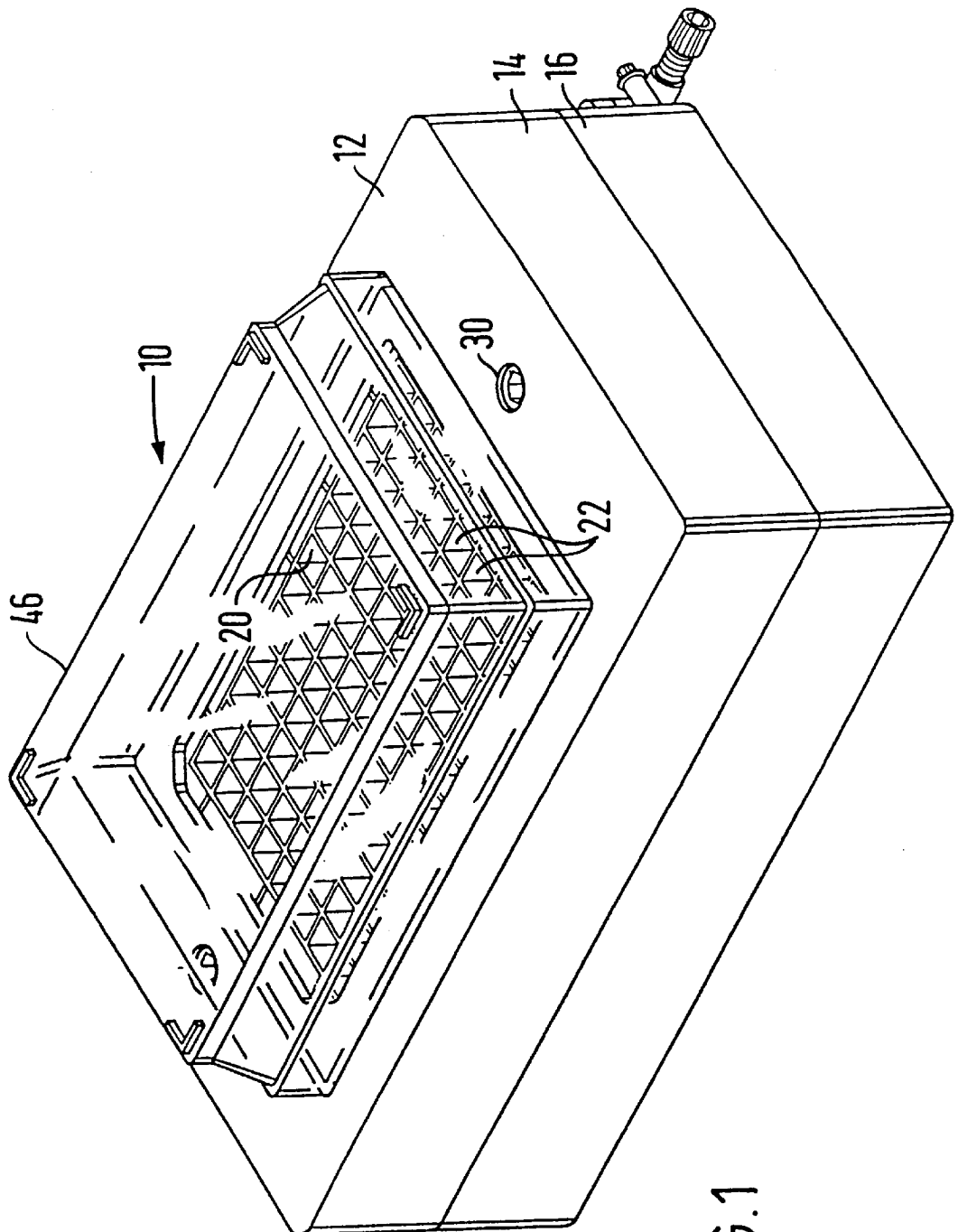
FIG. 1 is a perspective view of an exemplary chemical synthesizer according to the present invention.
Figure 2:
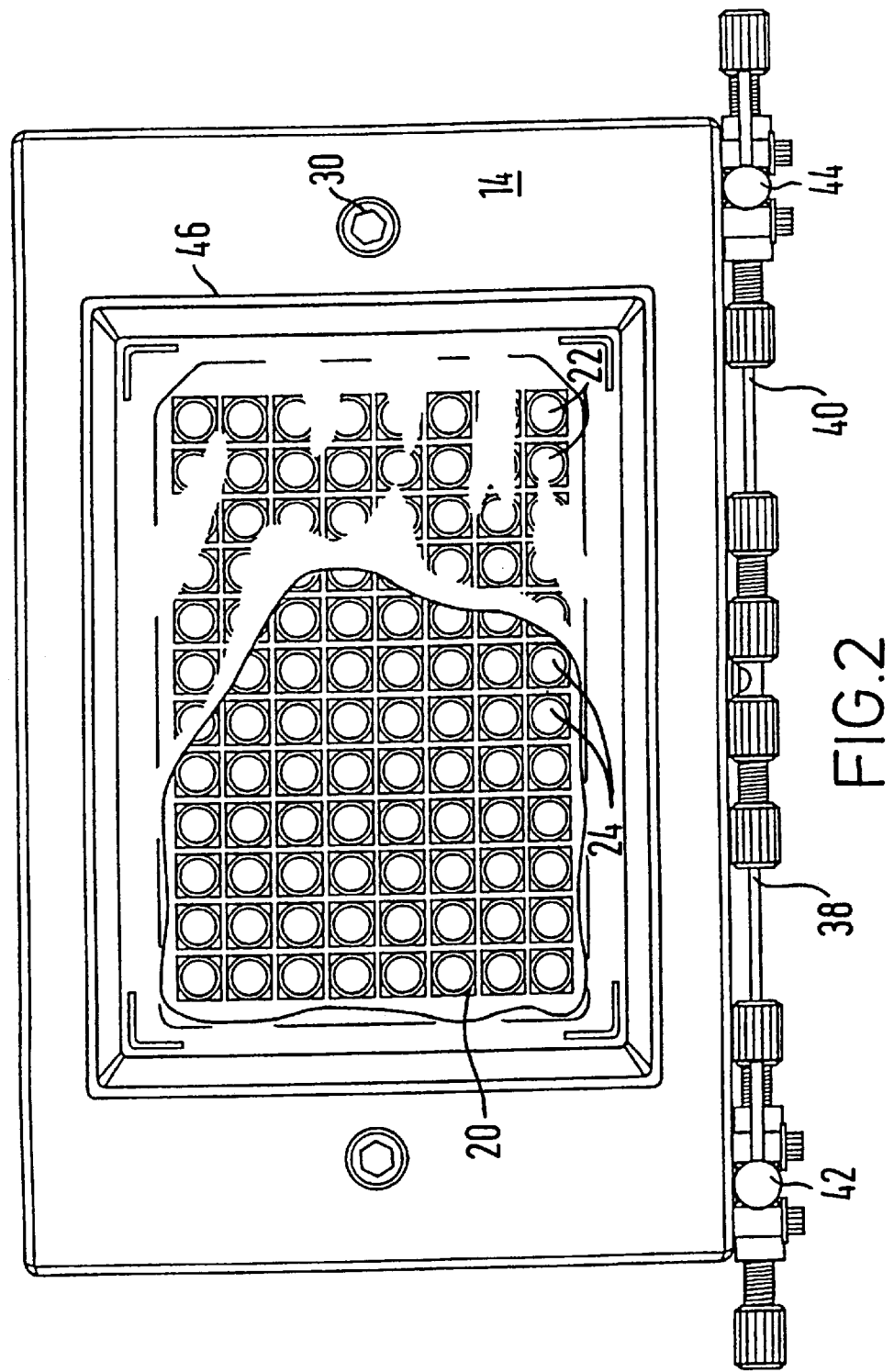
FIG. 2 is a top view of the synthesizer of FIG. 1.
Figure 3:
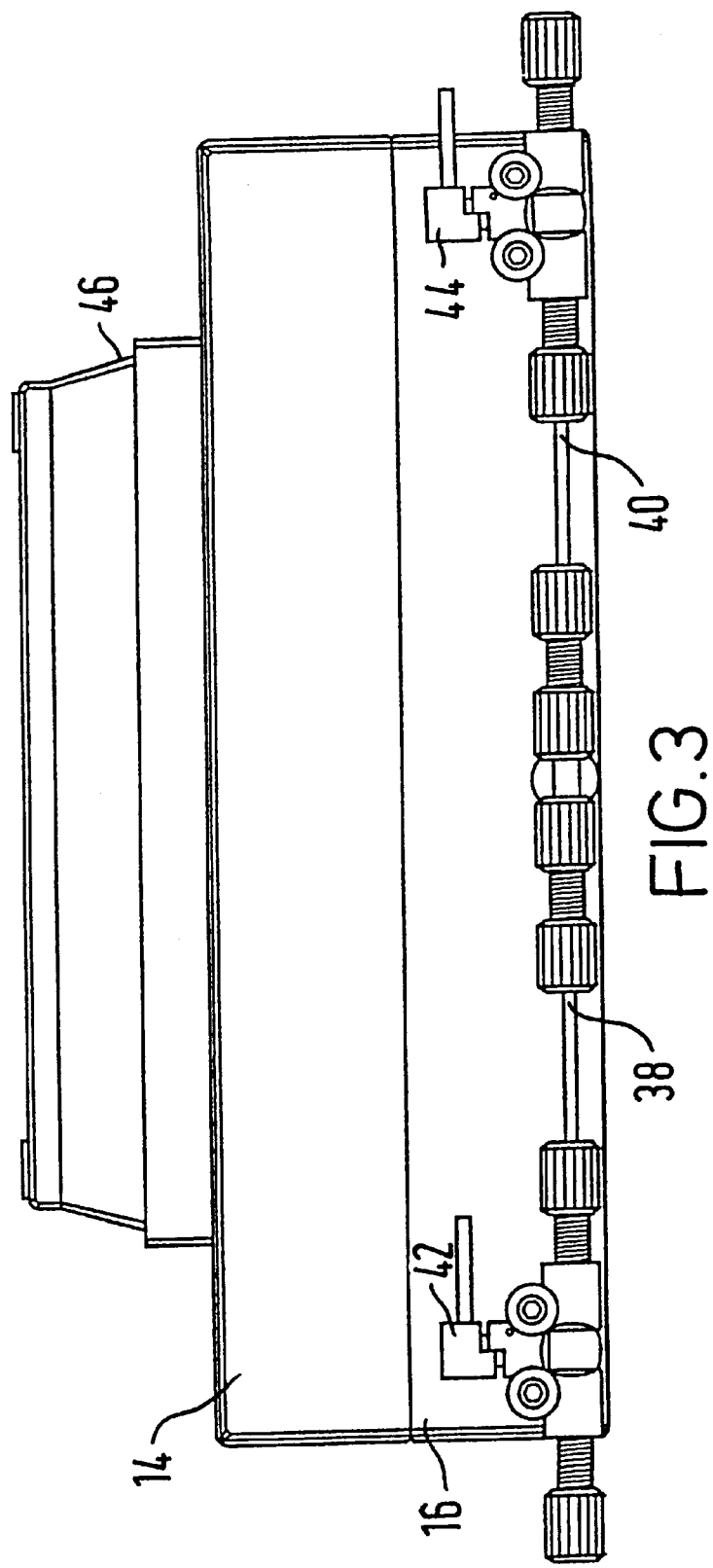
FIG. 3 is a side view of the synthesizer of FIG. 1.

The invention provides systems, devices and methods for simultaneously synthesizing large numbers of diverse chemical compounds onto solid supports and then cleaving the synthesized compounds from the supports in an efficient manner so that they will be prepared to be analyzed by commercially available analyzation equipment. In this manner, an efficient process is provided whereby diverse chemical compounds may be synthesized, cleaved, and organized into samples for analysis.

The invention will preferably employ the geometric configuration of standard microtiter plates throughout the entire process so that synthesis (including the steps of introducing various chemical compounds to the beads), cleavage, sample preparation and analytical data collection may all occur using standard equipment. In this manner, the time and effort required for chemical introduction, washing, cleavage and sample preparation is greatly reduced thereby making the overall process extremely efficient. For example, by having the reaction wells organized into a standard format, automated filling equipment and multi-channel pipettes may be employed to introduce various chemicals into the wells. Further, by having the cleaved compounds already organized into microtiter plate wells, standard equipment such as plate readers, speed vacuum concentrators, autosamplers, robotics liquid handling equipment, and the like may be employed to analyze the compounds. Usually, the microtiter plates will include ninety-six wells, although other numbers of wells (such as 864 well plates and the like) may be included depending on the particular application and available equipment.

The invention allows for efficient cleavage and sample preparation by synthesizing the various compounds in a plate having an array of wells. The wells have an opening in the bottom end so that following synthesis, the compounds may be cleaved and drained into a standard microtiter plate for subsequent analysis. In this way, sample preparation entails only the drainage of the cleaved compounds into the microtiter plate wells. To maintain the various fluids, such as reagents, washing solutions and cleavage solutions, within the wells, the invention provides the application of positive pressure to the holes in the bottom ends of the wells to prevent the fluids from leaking out. Preferably, a manifold is configured around the bottom of the plate so that a substantially uniform pressure will be applied at each bottom end. Preferably, an inert gas, such as argon, will be introduced into the manifold to maintain the fluids within the wells. To drain the fluids from the wells, application of the positive pressure is ceased and the fluids are allowed to drain through the holes. Optionally, a vacuum may be applied to the manifold to assist in draining the fluids from the wells. In this manner, fluids may be maintained within the wells for a significant period of time, i.e. on the order of days, while still being able to easily and efficiently remove the fluids from the wells when needed.

In one embodiment of the invention, at least one heat transfer member is provided to add heat to or remove heat from the wells of the plate. The heat transfer member will preferably be configured to heat the plate to a temperature in the range from about 20 degrees C. to about 200 degrees C. and to maintain such a temperature for any desired time period. Further, at least one heat transfer member may also be provided to cool the plate to a temperature within the range from about 20 degrees C. to about −100 degrees C., and in some cases from about 20 degrees C. to about −20 degrees C. Preferably, all of the wells in the plate will be maintained at approximately the same temperature, although in some cases is may be desirable to produce a temperature gradient within the plate. Further during some processes, it may be desirable to vary the temperature over specified time intervals.

Heating or cooling of the plate will preferably be accomplished by constructing the plate of a thermally conductive material, such as metals, aluminum, aluminum alloys, and the like, which has the wells or reaction vessels formed therein. At least a portion of the exterior of the plate is then heated or cooled. Exemplary heating elements include resistive heaters, such as an 80 W HD04-0100N heater available from Heater Cartridge, Wooddale, Ill. Exemplary cooling elements includes Peltier crystals (which can cool the plate to about −20 degrees C.), frozen substances, and the like. One exemplary Peltier device is model TE 9501/127/030B, available from Melcor Thermoelectrics. Such elements may be placed directly against the plate or within a thermally conductive material which is in direct contact with the plate. Another feature of the invention is that a housing may be provided to seal the plate and any heat transfer members from the outside environment. An inert gas will preferably fill the housing. With this arrangement, unwanted condensation will be substantially prevented from entering the wells during heating or cooling of the wells. In this manner, the synthesizing process may take place in a carefully controlled environment.

Referring now to FIGS. 1–4, an exemplary embodiment of a chemical synthesizer 10 will be described. Synthesizer 10 comprises a housing 12 which is constructed of a top half 14 and a bottom half 16. When top half 14 and bottom half 16 are placed together, they define an enclosure 18 (see FIG. 4) into which a multi-well plate 20 is received. Plate 20 includes ninety-six wells 22 which are sized to correspond to conventional multi-well plates as is known in the art, although other numbers and arrangements of wells may be used. Held within each of the wells 22 is a frit 24 (see FIG. 2) onto which solid supports are placed. In this manner, the solid supports may be suspended within the wells during the synthesizing process. Preferably, the frits are constructed of a teflon screen. Frits 24 will preferably be press fit into the wells so that they are held within the wells by friction. As such, the frits will preferably be cylindrical and have a height which is in the range from about 3 mm to about 1 cm.

Each of wells 22 includes a bottom end 26 (see FIG. 4), each of which includes a small hole (not shown) for draining fluids from the wells. Although the size of the holes may vary, for applications including ninety-six wells, the holes will preferably have a size in the range from about 0.1 mm to about 2 mm. Such size allows fluids to be maintained within the wells when a positive pressure is applied as described in greater detail hereinafter. Moreover, such a size allows for the fluids to be drained from the wells when application of the positive pressure is ceased. Plate 20 will preferably be constructed by drilling holes into the well bottoms of a conventionally sized multi-well plate, such as those commercially available from Polyfiltronics.

Synthesizer 10 further includes a resilient gasket 28 (see FIG. 4) which partially rests between halves 14 and 16 when placed together. When bolts 30 are turned to cinch halves 14 and 16 securely together, gasket 28 is compressed forcing it against plate 20 as shown in FIG. 4A. When plate 20 is placed upon bottom half 16, a peg 41 is positioned against an interior side of plate 20 so as to bias plate 20 against gasket 28 when gasket 28 is compressed against plate 20. In this manner, a seal is created between housing 12 and plate 20. In this way, a sealed space 31 is provided between a bottom end 32 of plate 20 and bottom half 16. Space 31 functions as a manifold so that when either a positive or negative pressure is introduced into space 31 it will be evenly distributed at bottom ends 26 of wells 22.

Figure 4:
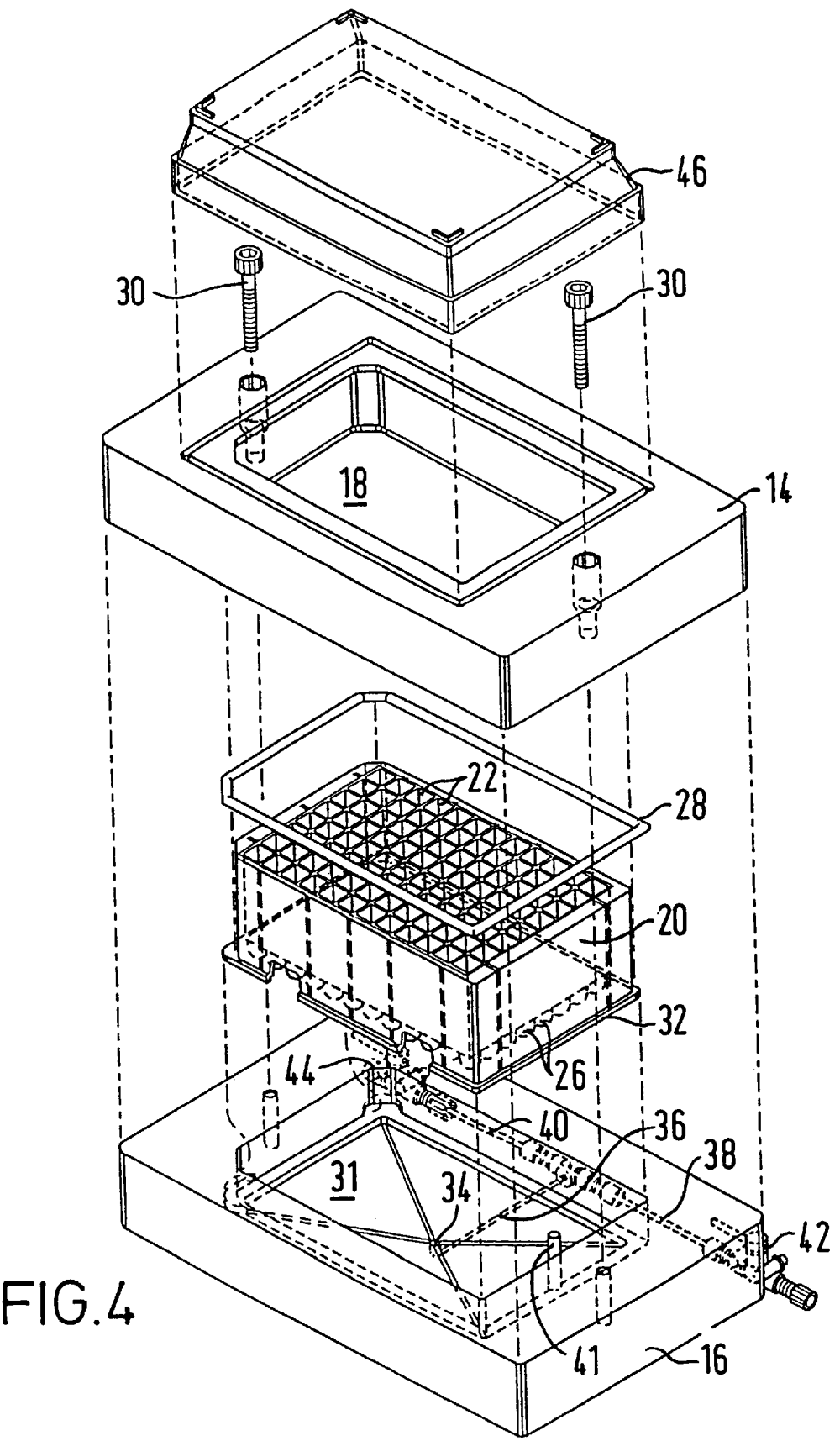
FIG. 4 is an exploded view of the synthesizer of FIG. 1.
Figure 4A:
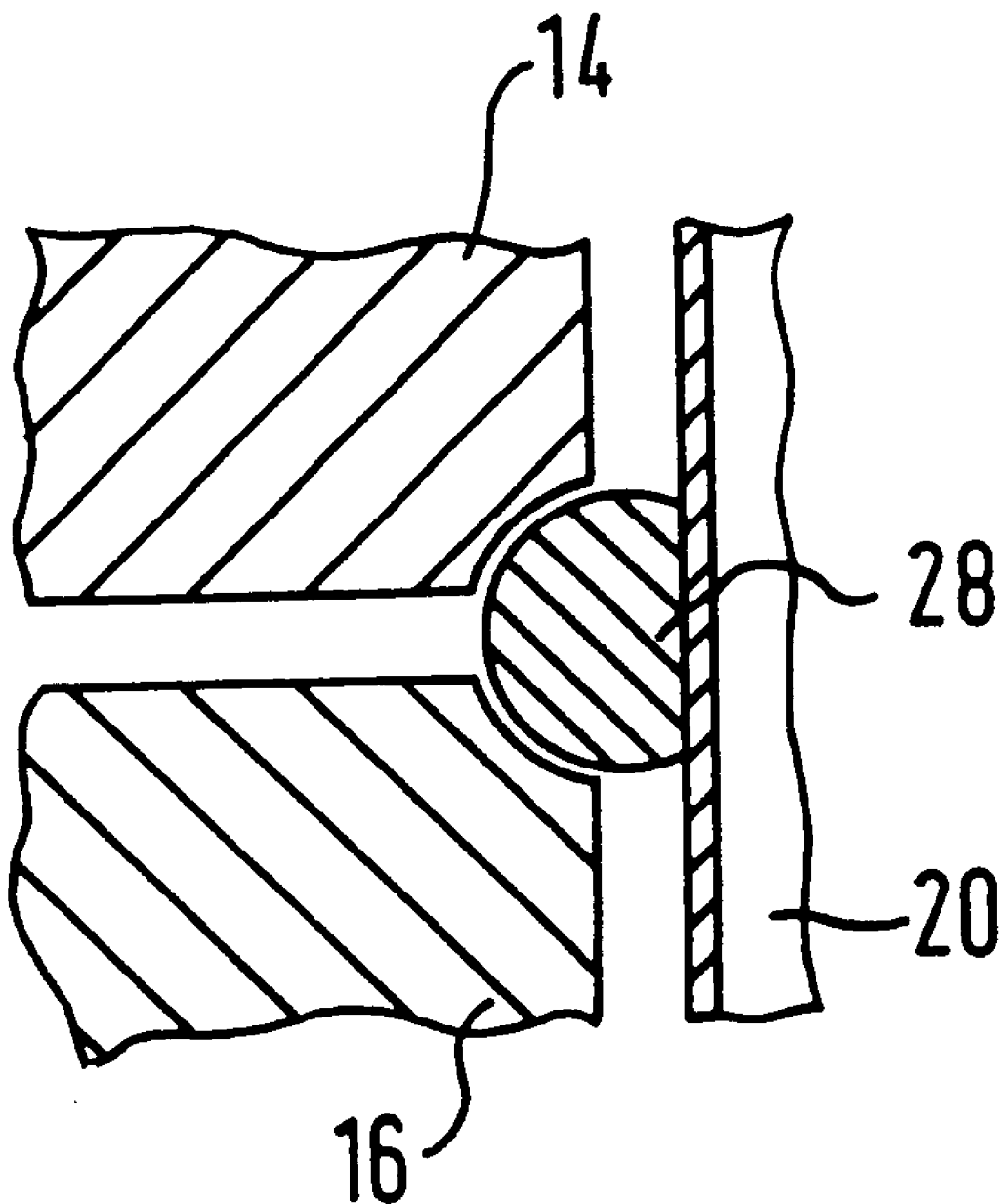
FIG. 4A is a cross sectional side view of a gasket of the synthesizer of FIG. 1 which is sealed against a multi-well plate.
Figure 5:
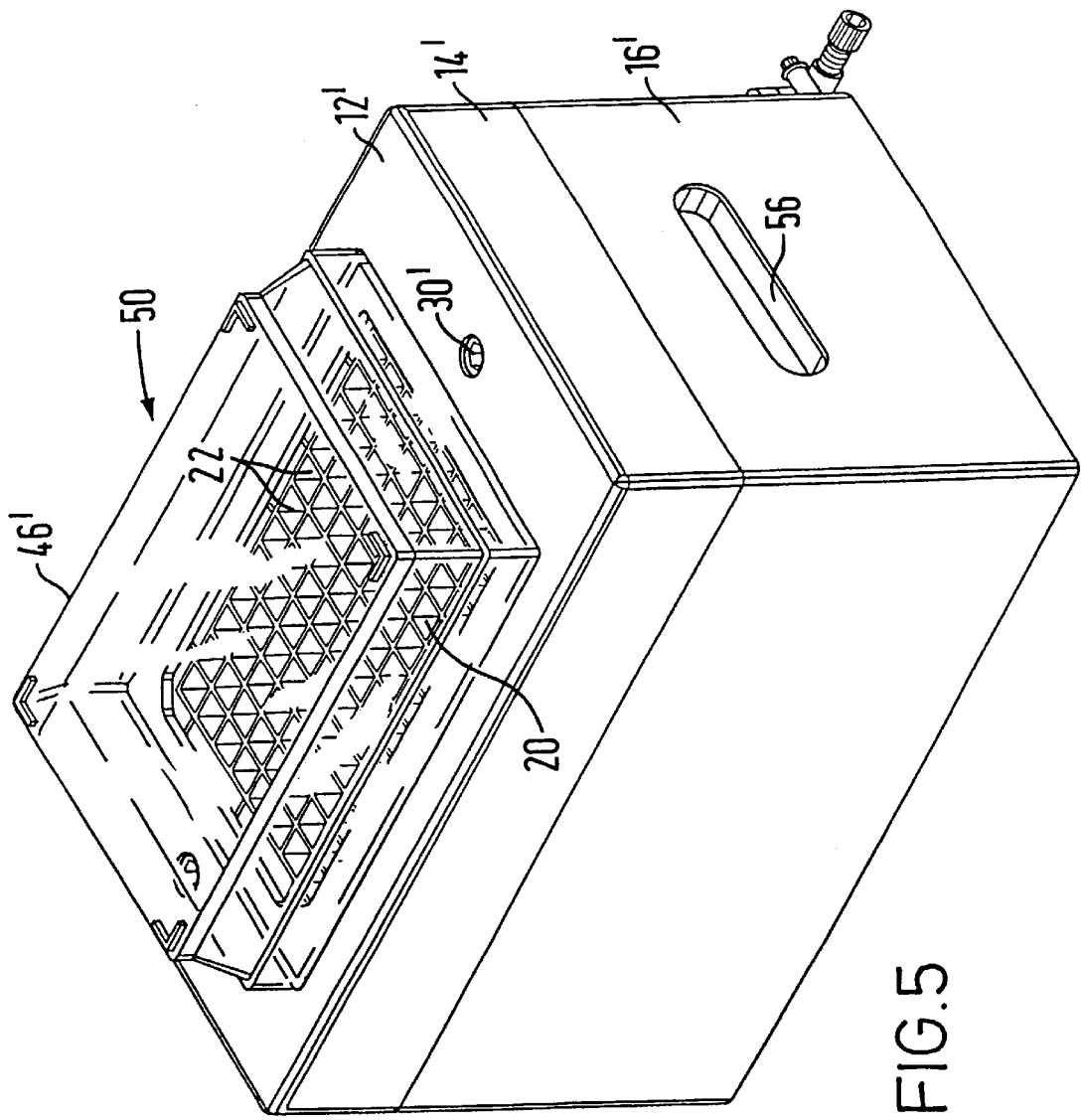
FIG. 5 is a perspective view of an exemplary cleavage device according to the present invention.
Figure 6:
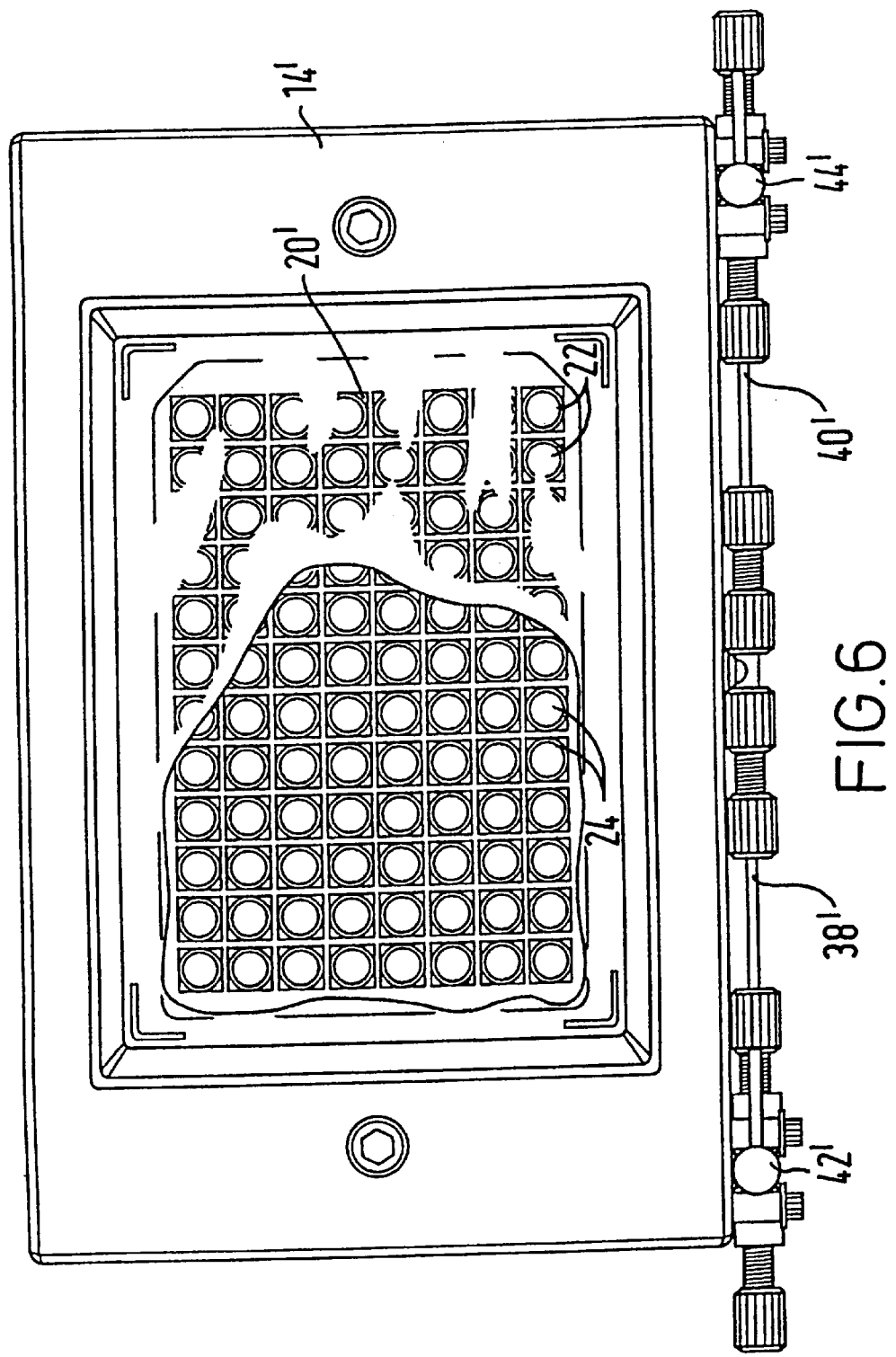
FIG. 6 is a top view of the cleavage device of FIG. 5.
Figure 7:
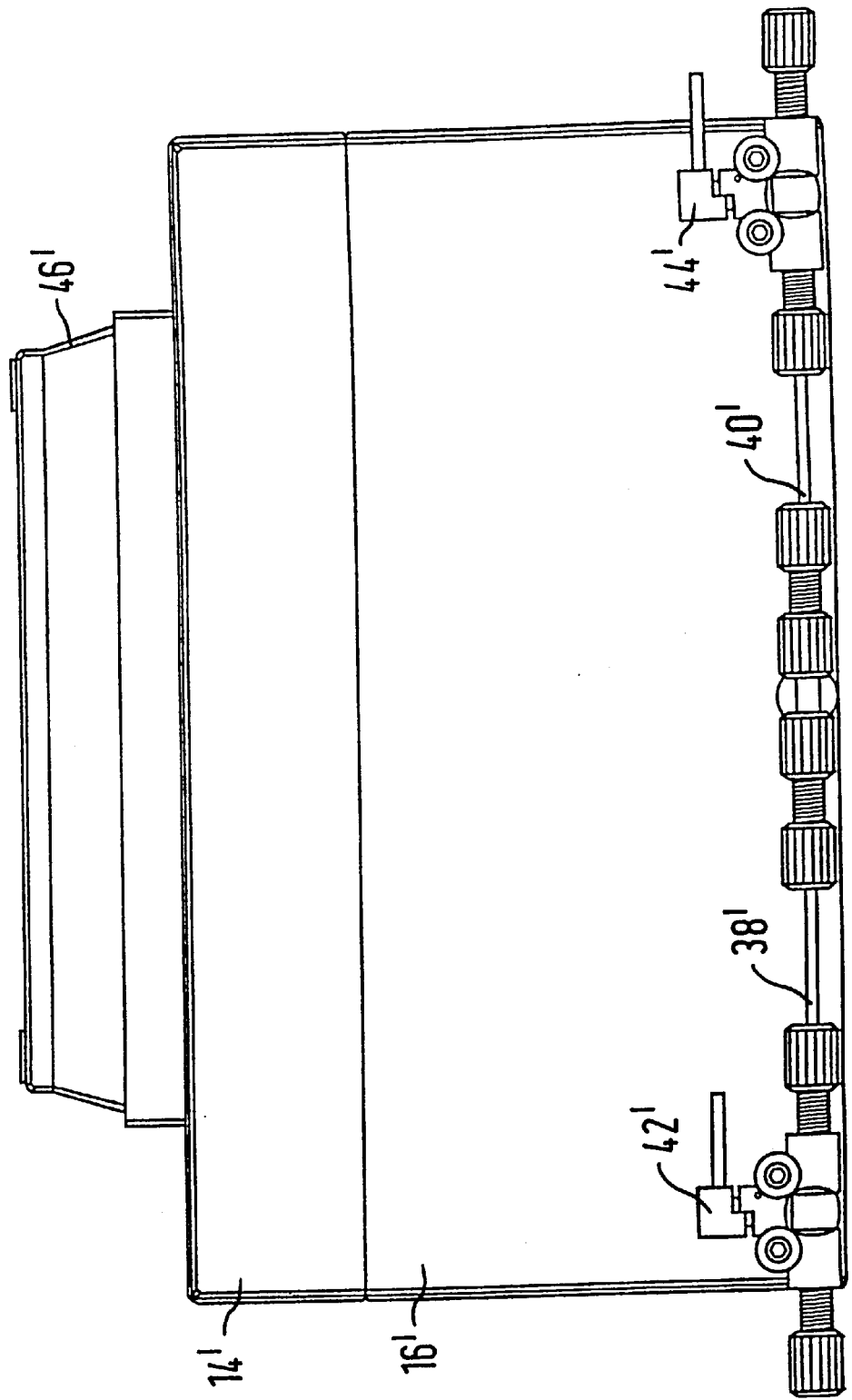
FIG. 7 is a side view of the cleavage device of FIG. 5.
Figure 8:
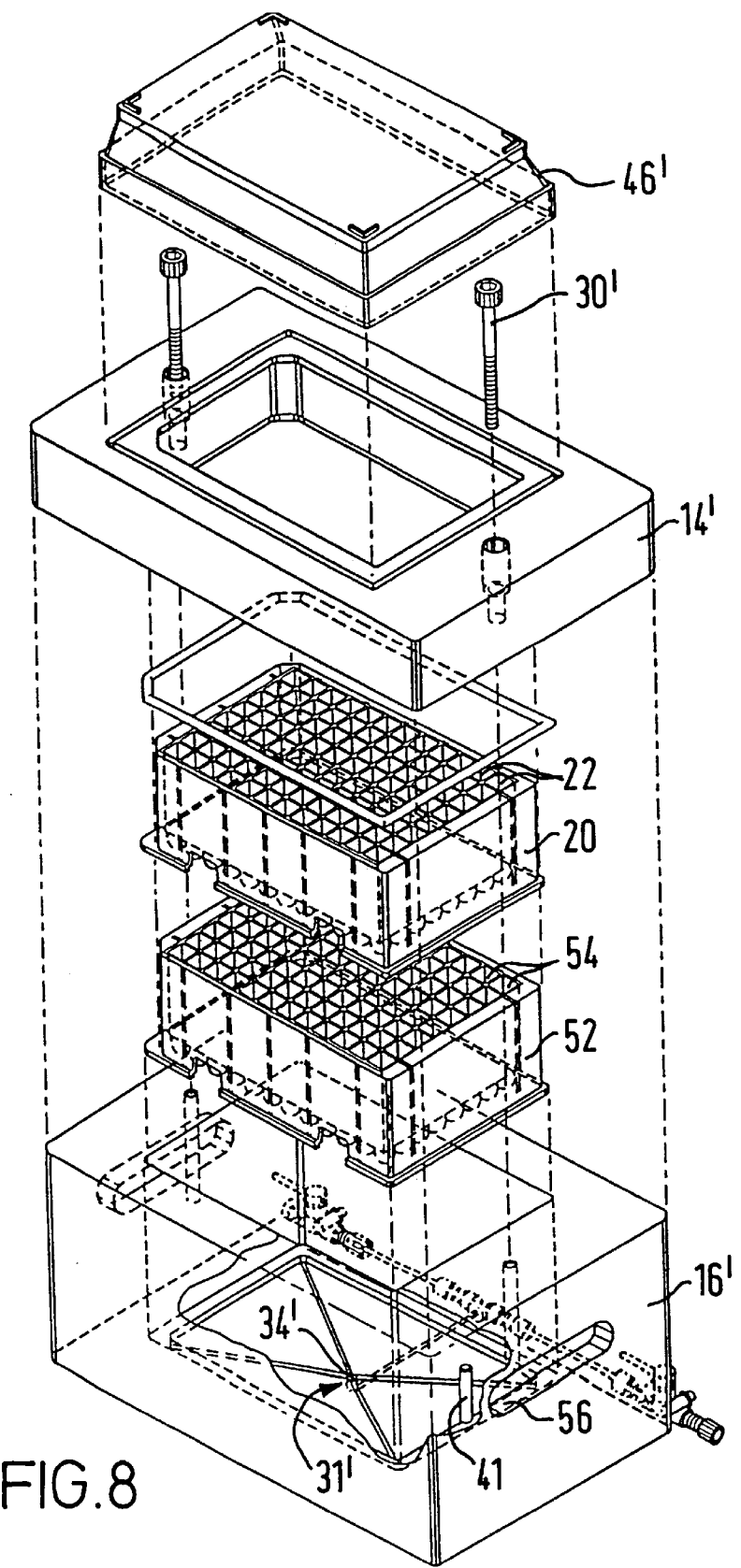
FIG. 8 is an exploded view of the cleavage device of FIG. 5.

As best shown in FIG. 4, an opening 34 is provided within bottom half 16 and allows for the introduction of either a positive or negative pressure into space 31. Optionally, space 31 may be tapered as shown to facilitate drainage of liquids from wells 22 through opening 34. Synthesizer 10 further includes a common line 36 (see FIG. 4), a pressure line 38 and a vacuum line 40. Pressure line 38 and vacuum line 40 are connected to common line 36 with a T-fitting. A pressure valve 42 is provided on line 38 and a vacuum valve 44 is provided on line 40. With this arrangement, a pressure source, such a source of inert gas, may be connected to pressure line 38 while a vacuum source may be connected to vacuum line 40. To introduce a positive pressure into space 31, pressure valve 42 is opened while vacuum valve 44 is closed. Alternatively, to produce a vacuum within space 31, pressure valve 42 is closed while vacuum valve 44 is opened. In this manner, fluids may be maintained within wells 22 by opening pressure valve 42 to create a generally uniform pressure within space 31. When fluids are ready to be drained from wells 22, valve 42 is closed and vacuum valve 44 is open. A vacuum is then created in space 31 which draws the fluids through the holes of the wells where they are drained through opening 34.

When liquids are included within wells 22 and pressure valve 42 is opened, the inert gas will tend to bubble through wells 22. To maintain a generally constant pressure within space 31, a pressure regulator (not shown) may be placed in communication with pressure line 38 to control the amount of gas being introduced into space 31. Synthesizer 10 also includes a lid 46 which is placed on top of top half 14 and serves to collect any inert gas bubbled through wells 22. In this manner, a generally inert environment is provided above wells 22 during synthesis and related processes.

Referring now to FIGS. 5–8, an exemplary embodiment of a cleavage device 50 will be described. Cleavage device 50 is essentially identical to chemical synthesizer 10 as previously described except for the size and shape of its enclosure. For convenience of discussion, analogous elements of cleavage device 50 will be referred to using the same reference numerals used to describe synthesizer 10 followed by a single quote "'".

Cleavage device 50 differs from chemical synthesizer 10 in that the enclosure 18 is sized and shaped to receive both multi-well plate 20 and a receiving multi-well plate 52. Receiving plate 52 preferably includes the same number of wells as plate 20. However, receiving plate 52 differs from plate 20 in that wells 54 of plate 52 do not include a frit and do not have holes in the bottom. In this manner, liquids from plate 20 may be drained into the wells 54 of receiving plate 52 when plate 20 is stacked on top of plate 52. Preferably, liquids will be drained from wells 22 of plate 20 and into wells 54 of plate 52 by opening vacuum line 44' to produce a negative pressure within space 31. Such a negative pressure will draw the liquids through the holes of wells 22 where it will fall with the assistance of gravity into wells 54. Halves 14' and 16' may then be separated and plate 52 removed for analysis of the removed compounds in conventional processing equipment. Optionally, plate 52 may be configured to be essentially identical to plate 20.

Optionally, cleavage device 50 may include handles 56 (see FIG. 5) within housing 12 to facilitate handling of the device.

Referring now to FIGS. 1–8, an exemplary method for synthesizing various compounds onto solid supports, cleaving the synthesized compounds and preparing them for analysis will be described. The synthesizing process begins by placing plate 20 within top half 14 and bottom half 16 of synthesizer 10. Bolts 30 are then tightened to secure plate 20 within housing 12 and to expand gasket 28 to form a seal as previously described. Solid supports are then placed into wells 22 so that they rest upon frits 24. Pressure valve 44 is then opened to allow a positive pressure to build within space 31. Various reagents are then introduced into wells 22 having the solid supports, preferably employing a multi-channel pipette or other type of automated filling equipment. In this manner, wells 22 may rapidly be filled with the desired reagents using standard equipment. Because of the positive pressure within space 31, the reagents are prevented from draining through the holes in the bottom end of wells 22. Moreover, the inert gas bubbles through wells 22 to help mix the solid supports with the reagents. The pressure within space 31 may be regulated to maintain the desired positive pressure within space 31. Preferably, a positive pressure that is in the range from about 0.05 psi to about 10 psi, and more preferably from about 0.05 psi to about 1 psi, will be produced within space 31 during the synthesis process. While the reagents are within wells 22, lid 46 is placed over top half 14 to provide a generally inert atmosphere above wells 22 during synthesis. Lid 46 is configured to loosely sit on top half 14 so that gasses can exit or enter into enclosure 18 through the interface between lid 46 and top half 14 when a vacuum or positive pressure is supplied.

After an appropriate amount of time, the reagents are drained from wells 22 by closing pressure valve 42 and opening vacuum valve 44. This creates a negative pressure within space 31 to assist in draining the reagent from wells 22. Preferably, a pump having a capacity sufficient to draw at least about 40 liters per minute through enclosure 18 will be employed. Such a capacity will draw sufficient air through enclosure 18 to assist in draining the liquids. The drained reagents are funneled into opening 34 where they may be collected into a waste bottle. A washing procedure may then take place by pipetting a washing solution into each of the wells while positive pressure is supplied to space 31. After washing, the solvents are drained by closing pressure valve 42 and opening vacuum valve 44. Several washings may occur as needed.

Following synthesis, halves 14 and 16 are separated and plate 20 is removed from synthesizer 10. Plate 20 is then placed on top of receiving plate 52, and the combined plates are placed within cleavage device 50. Halves 14' and 16' are then secured together so that cleavage may occur. The cleavage process begins by pipetting a cleavage solution, such as trifluorocidic acid, into each of wells 22. At the same time, pressure valve 42' is opened to provide positive pressure within space 31' so that the cleavage solution remains within wells 22. After a desired amount of time, the cleavage solution is drained from wells 22 and into wells 54 of receiving plate 52. This is best accomplished by closing pressure valve 42' and opening vacuum valve 44'. The negative pressure within space 31' helps drain the cleavage solution from wells 22 where it falls with the assistance of gravity into wells 54. In this manner, samples are placed within wells 54 in an efficient manner.

Analysis of the samples within wells 54 is accomplished by removing receiving plate 52 from cleavage device 50 and placing it into commercially available analysis equipment which is configured to be compatible with standard sized microtiter plates.

A particular advantage of using both chemical synthesizer 10 and cleavage device 50 is that following synthesis, plate 20 may be removed from synthesizer 10 and placed into cleavage device 50. In this manner, synthesizer 10 is available to receive another plate so that additional compounds may be synthesized. In this manner, a continuous process of synthesizing compounds, cleaving the synthesized compounds and preparing samples for analysis may occur.

Figure 9:
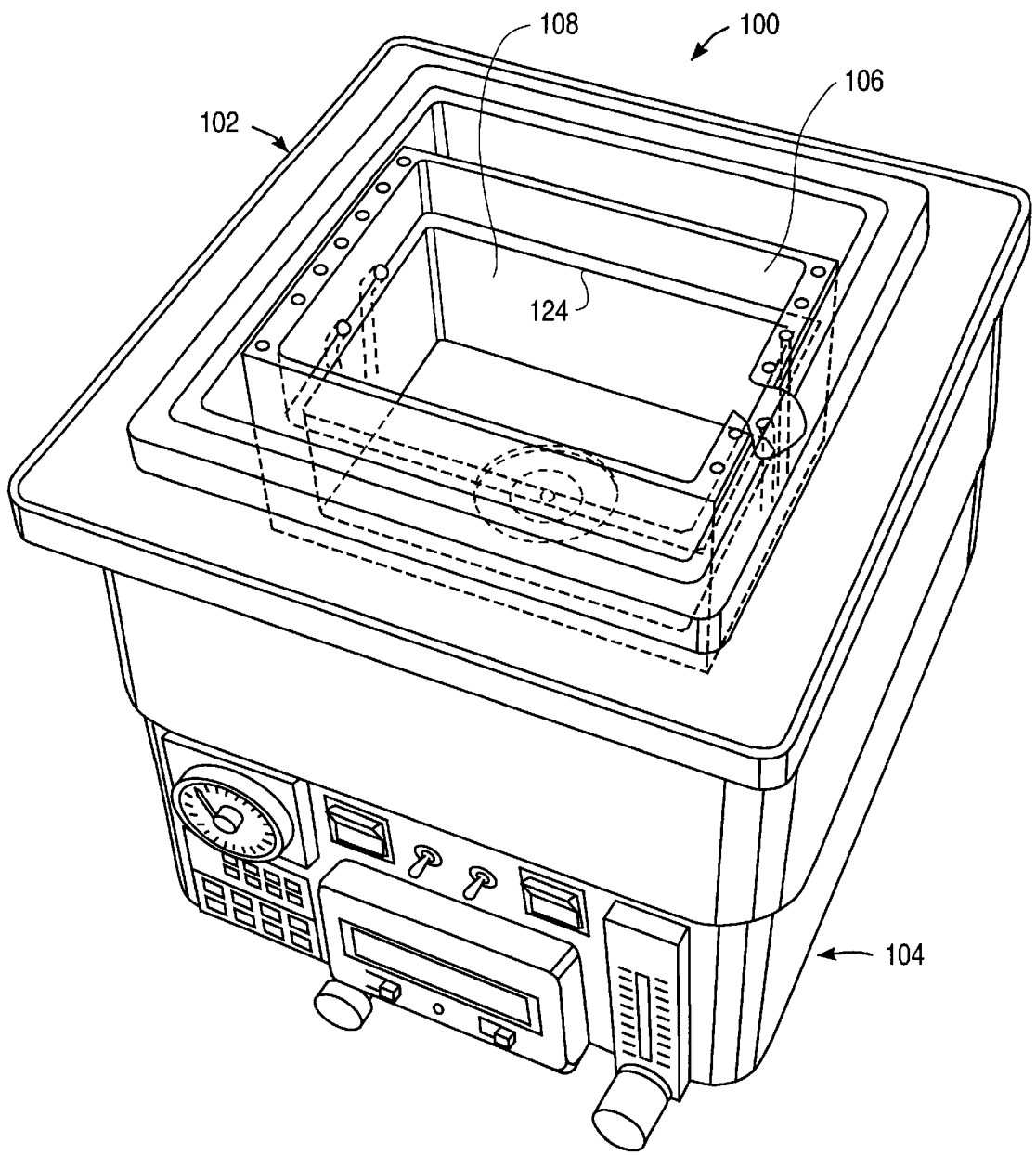
FIG. 9 is a perspective view of another exemplary chemical synthesizer according to the present invention.

Referring now to FIG. 9, another exemplary embodiment of a chemical synthesizer 100 will be described. Synthesizer 100 may be generally divided into a top portion 102 and a bottom portion 104. Top portion 102 includes a reaction chamber 106 where synthesis occurs while bottom portion 104 includes a variety of controllers, regulators, meters, and the like to assist in the synthesizing process as described in greater detail hereinafter.

Figure 10:
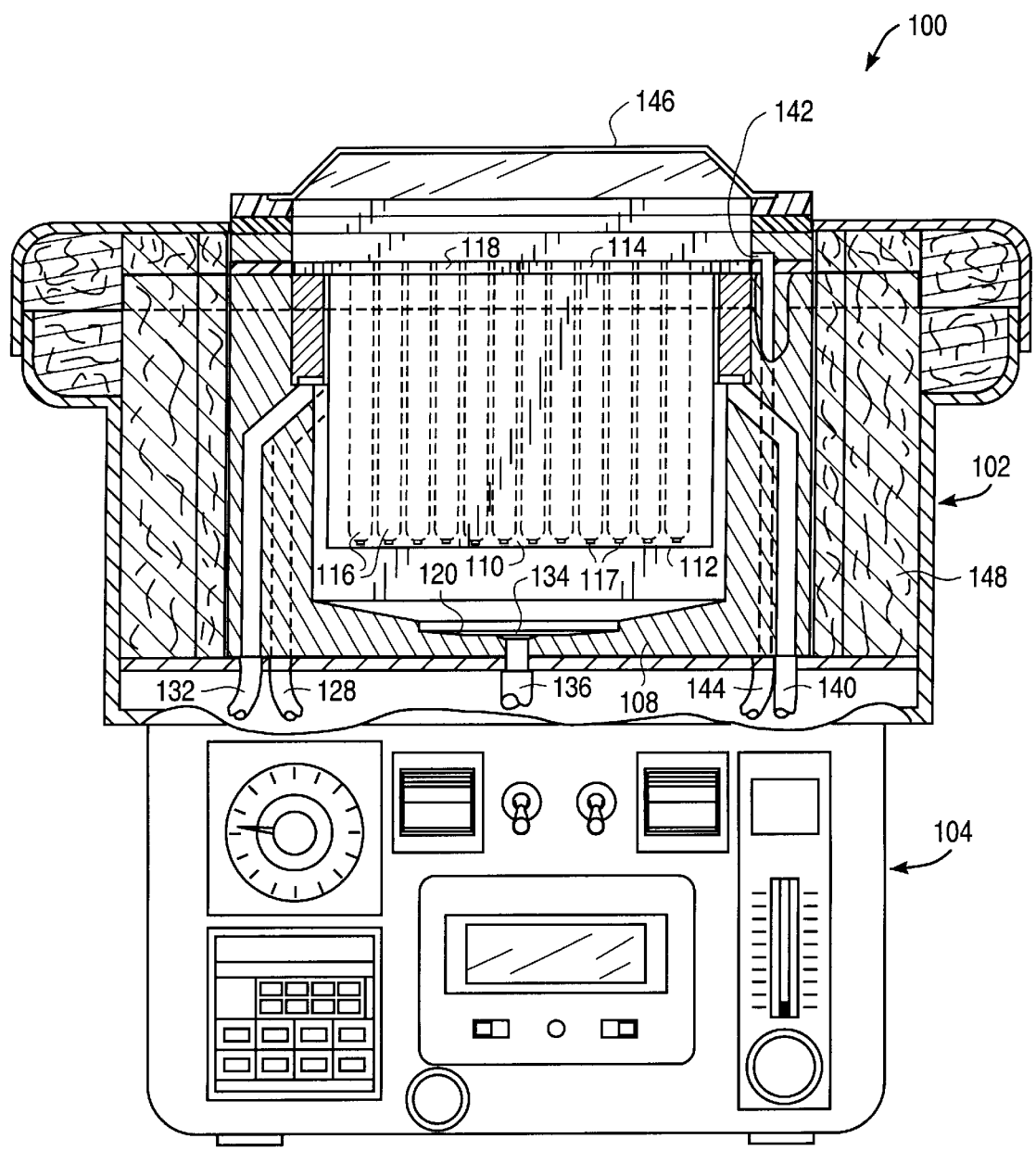
FIG. 10 is a front view of the synthesizer of FIG. 9 illustrating a control panel and a cut-away view of a reaction chamber and a reaction block.

As best shown in FIG. 10, reaction chamber 106 is constructed of a base member 108 into which a reaction block 110 is received. Reaction block 110 includes a bottom end 112, a top end 114 and a plurality of reaction vessels 116. Reaction vessels 116 are open at top end 114 and are in fluid communication with bottom end 112 via small apertures 117. In this way, fluids may be held within reaction vessels 116 by application of positive pressure to bottom end 112 similar to the embodiments previously described.

Top end 114 includes an edge 118 (see also FIG. 11) which allows reaction block 110 to rest on base member 108, with bottom end 112 being spaced apart from a tapered bottom end 120 of base member 108. More specifically, edge 118 rests upon a seal 122 which in turn rests upon a lip 124 (see FIG. 9) of base member 108. In this way, the combination of reaction block 110 and base member 108 define a manifold so that positive or negative pressure may be applied to reaction vessels 116 via apertures 117. Preferably, apertures 117 will have a size in the range from 0.1 mm to about 2 mm to allow fluids to be maintained within reaction vessels 116 by application of positive pressure within the manifold.

Figure 11:
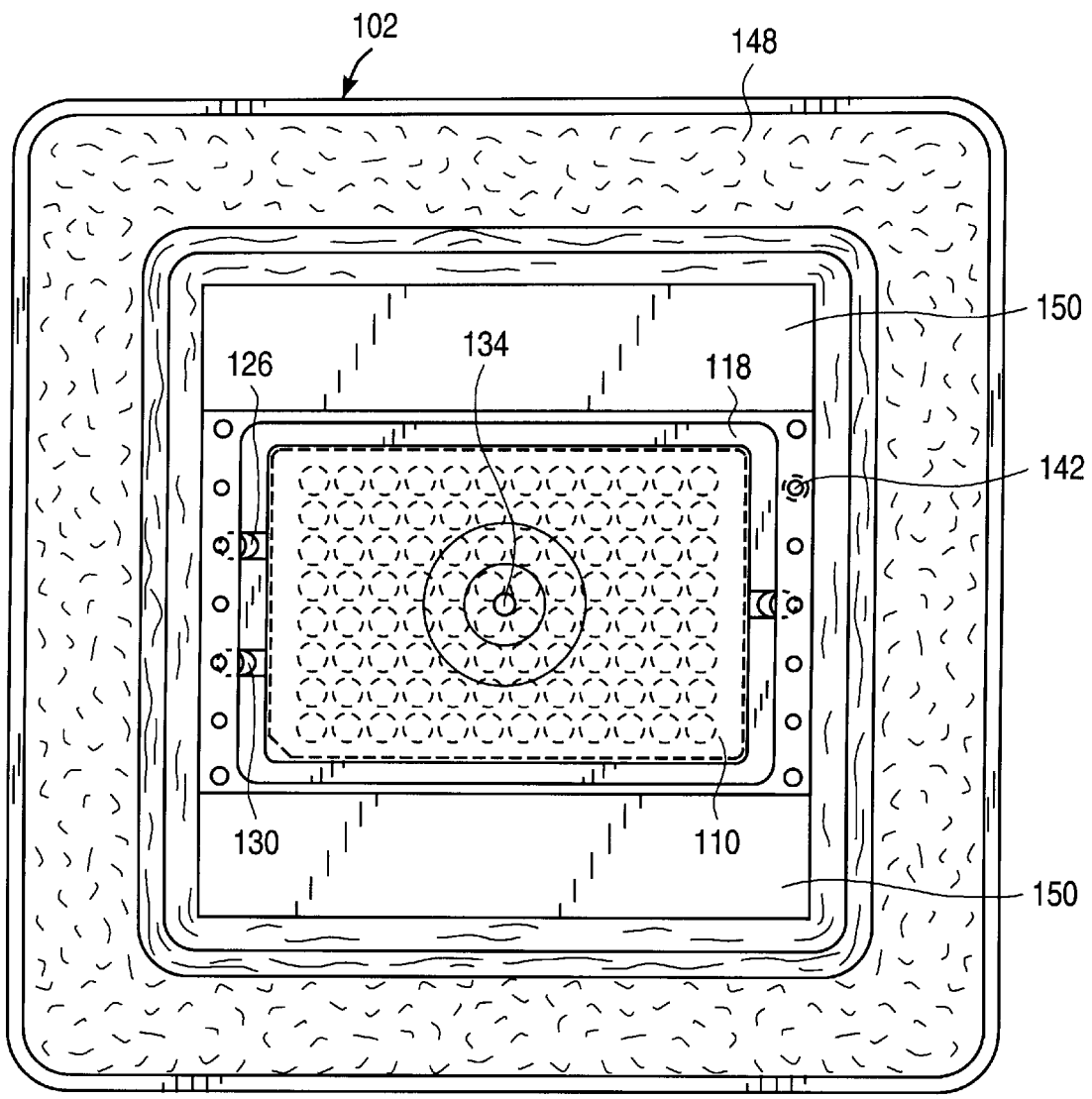
FIG. 11 is a top view of the synthesizer of FIG. 9 illustrating the reaction chamber and surrounding insulation.
Figure 12:
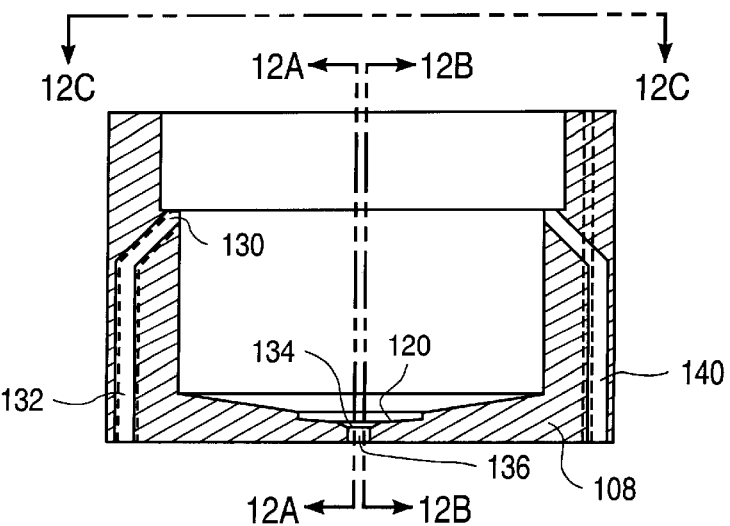
FIG. 12 is a cross-sectional side view of the reaction chamber of the synthesizer of FIG. 9.
Figure 12A:
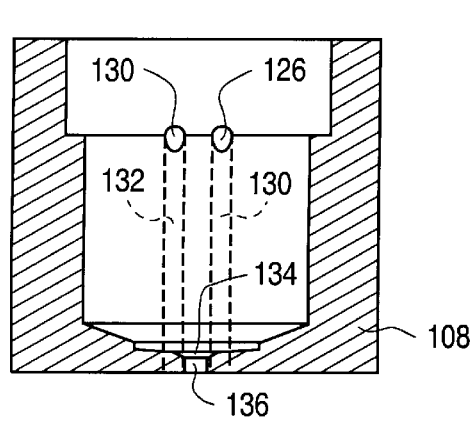
FIG. 12A is a cross-sectional side view of the reaction chamber of FIG. 12 taken along lines 12A—12A.
Figure 12B:
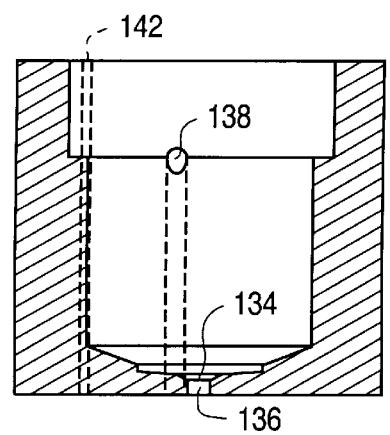
FIG. 12B is a cross-sectional side view of the reaction chamber of FIG. 12 taken along lines 12B—12B.

Referring to FIGS. 10–12, configuration of various vacuum and positive pressure lines to hold fluids within chambers 116 and to drain the fluids from chambers 116 will be described. Base member 108 includes an opening 126 at the end of a positive pressure line 128. In this way, positive pressure may be applied through line 128 and distributed into the manifold to apply positive pressure to apertures 117 to hold fluids within reaction chambers 106.

Base member 108 further includes an opening 130 at the end of a vacuum line 132. When a vacuum is applied to line 132, a vacuum is created within the manifold to drain fluids from reaction vessels 116 and into tapered bottom end 120. The positioning of opening 120 vertically above tapered bottom end 120 is advantageous in that a large vacuum may be produced within the manifold without hinderance from the draining fluids which accumulate within bottom end 120. Tapered bottom end 120 includes an opening 134 at its apex which allows fluids drained from reaction vessels 116 to be evacuated from base member 108. Attached to opening 134 is a vacuum line 136 to assist in draining the fluids through opening 134. In this way, a separate vacuum line is employed to drain fluids from the manifold once the fluids have been drained from the reaction block.

Base member 108 still further includes another opening 138 at the end of a conduit 140. Conduit 140 provides a path for appropriate wiring so that a pressure gauge (not shown) may be placed at or near opening 138. In this way, the pressure within the manifold may be monitored near bottom end 112 of reaction chamber 106. Positioning of the pressure gauge at such a location is advantageous in that more precise pressure measurements may be made.

Base member 108 includes yet another opening 142 to which a pressure line 144 is attached. Pressure line 144 is preferably employed to supply a pressurized inert gas over top end 114 of reaction block 110. In this way, a blanket of inert gas may be produced over the reaction vessels 116. Optionally, a cover 146 (see FIG. 10) may be placed over top portion 102 to completely enclose reaction chamber 106 from the outside environment. In this way, reaction block 110 is substantially surrounded with an inert gas. In this manner, a non-flammable environment is created within reaction chamber 106. The inert gas also prevents condensation of vapors as well as providing an inert atmosphere to prevent contamination of the chemicals when introduced into the reaction vessels 116.

As best shown in FIGS. 10 and 11, top portion 102 includes a layer of insulation 148 to insulate reaction block 110 from the outside environment. In this way, the temperature of the reaction chambers may be precisely controlled. As illustrated in FIG. 11, top portion 102 includes regions 150 for receiving a temperature altering substance, such as dry ice, as will be described in greater detail hereinafter. Also as described in greater detail hereinafter, base member 108 may be adapted to receive various heating or cooling elements so as to control the temperature of reaction chamber 106. Preferably, reaction chamber 106 will be constructed of a thermally conductive material, such as aluminum, so that as base member 108 is heated or cooled, heat will be rapidly transferred to or from reaction vessels 116.

Figure 13:
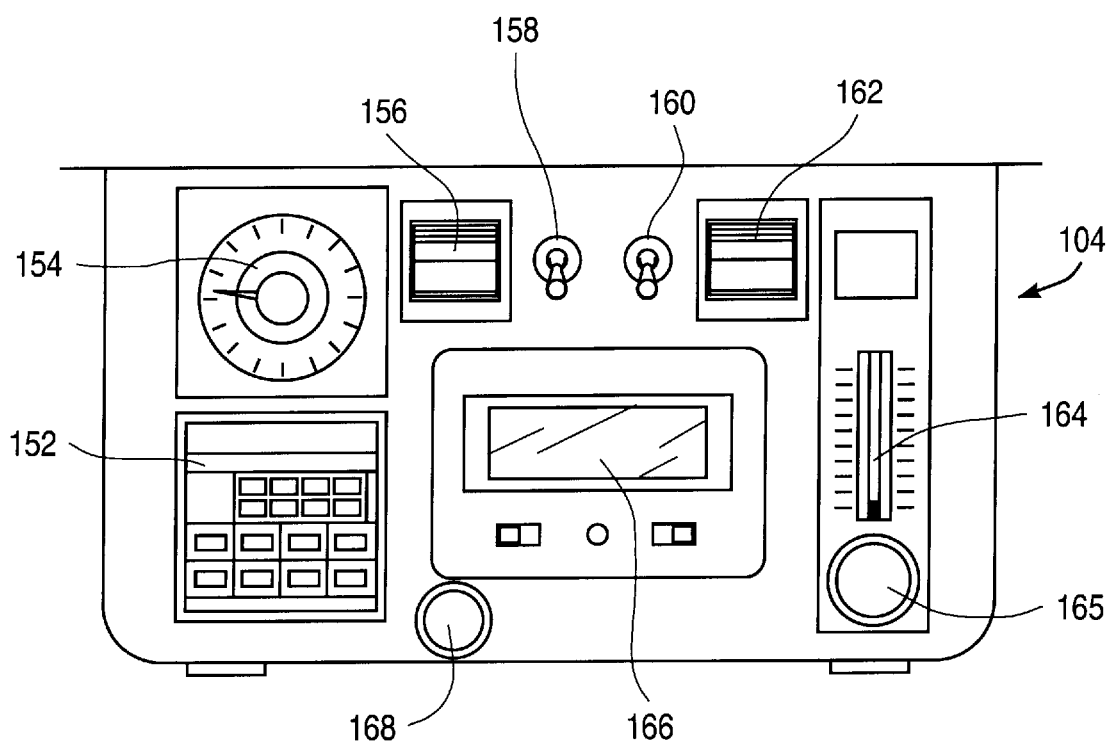
FIG. 13 is a front view of the control panel of the synthesizer of FIG. 9.

Referring now to FIG. 13, bottom portion 104 will be described in greater detail. Describing the elements in a clockwise manner, bottom portion 104 includes a positive temperature control 152 for controlling various heating elements within synthesizer 100 as described in greater detail hereinafter. Positioned above positive temperature control 152 is a timer 154 which may be set to control actuation of various heating elements which are controlled by temperature control 152. Conveniently, an on\off switch 156 is provided to initiate the heater and timer 154. Adjacent switch 156 is a temperature sensor thermocouple switch 158 which is employed to control actuation of various thermocouples within synthesizer 100. A three-way switch 160 is provided to control application of pressure within synthesizer 100 as described in greater detail hereinafter. Another heater switch 162 is also provided to control which of the heaters within synthesizer 100 will be actuated.

Figure 12C:
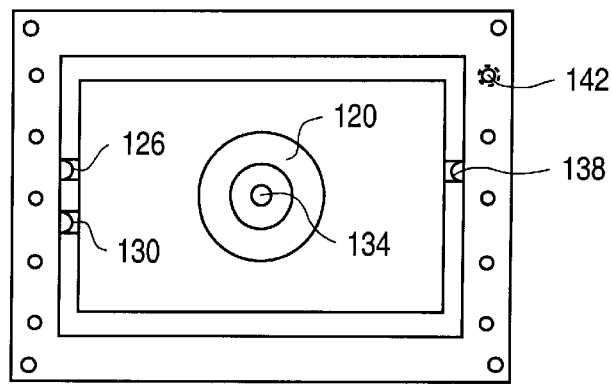
FIG. 12C is a top view of the reaction chamber of FIG. 12 taken along lines 12C—12C.

Bottom portion 104 further includes a flow meter 164 for measuring the flow of an inert gas through synthesizer 100 as will be described in greater detail hereinafter. A flow meter knob 165 is provided to regulate the amount of flow through line 144 (See FIG. 10) which produces the blanket of inert gas over reaction block 110. A digital pressure meter 166 is further provided for monitoring the pressure of a pressure sensor within opening 138 (see FIG. 12C). A pressure regulator knob 168 is provided to regulate the amount of positive pressure introduced into synthesizer 100.

Figure 14:
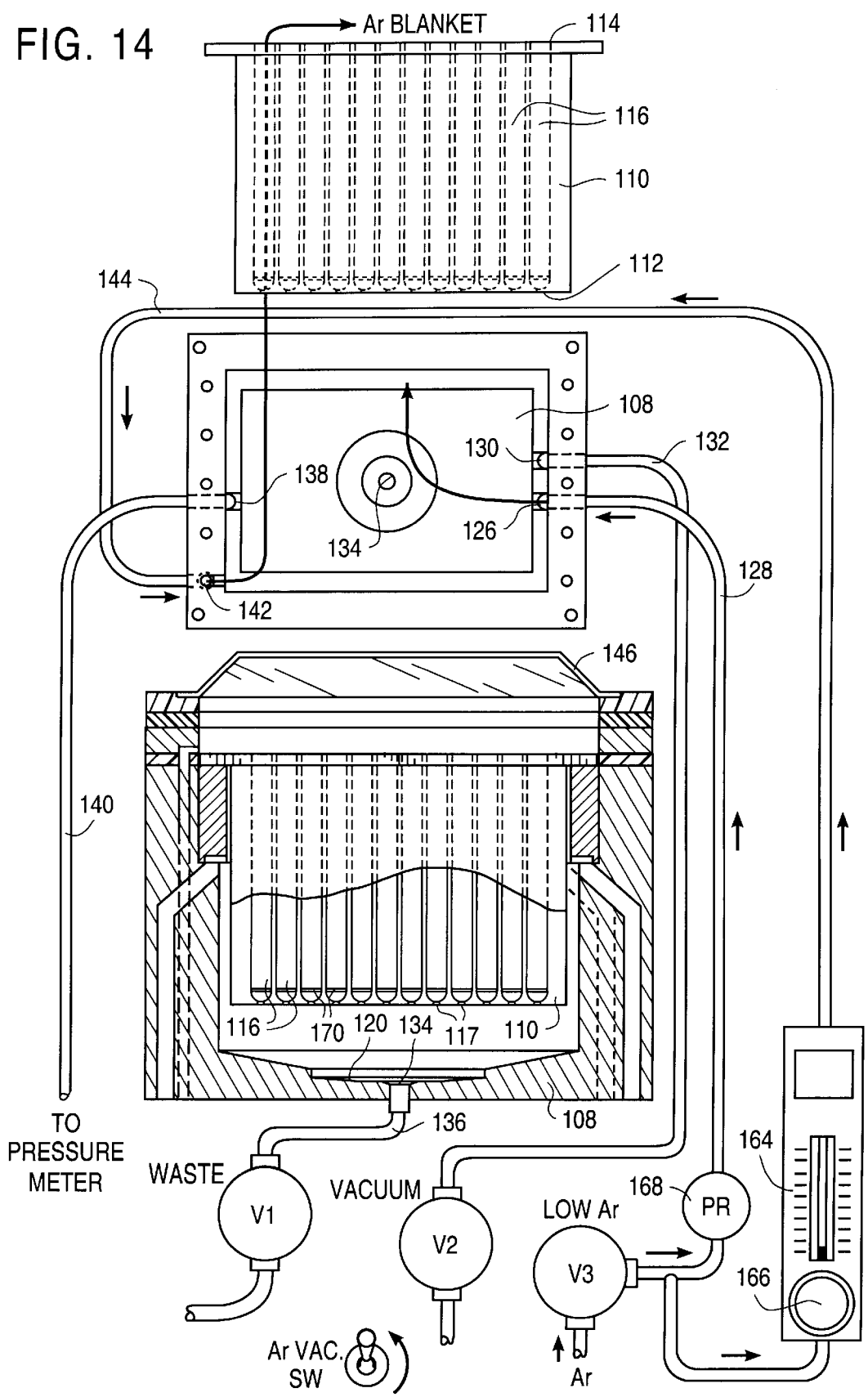
FIGS. 14–17 illustrate a method for synthesizing chemical compounds onto solid supports using the synthesizer of FIG. 9.

Referring now to FIGS. 14–17, an exemplary method for synthesizing various compounds onto solid supports using chemical synthesizer 100 will be described. For convenience of illustration, FIGS. 14–17 illustrate selective portions of chemical synthesizer 100 arranged to facilitate explanation of the synthesizing process. As illustrated in FIG. 14, each of reaction vessels 116 includes a frit 170 onto which various solid supports are to be placed. Prior to introduction of the solid supports, a supply of an inert gas, such as argon, is supplied to positive pressure line 128 through a valve V3. The amount of argon supplied to positive pressure line 128 is controlled by pressure regulator 168. As illustrated by the arrow, the argon gas exits line 128 through opening 126 where it will fill the manifold and supply positive pressure to apertures 117. Argon gas passing through valve V3 also passes into line 144, where it in turn will flow through flow meter 164. Flow meter knob 165 may be adjusted to regulate the amount of argon passing through line 144. The argon gas exits line 144 through opening 142 and will pass over top end 114 of reaction block 110 as illustrated by the arrow. In this way, an inert atmosphere will be created both within reaction vessels 116 and above reaction block 110. During this process, valves V1 and V2 which control the application of a vacuum to lines 136 and 132, respectively, will be closed (by placement of switch 160 in the up position).

Figure 15:
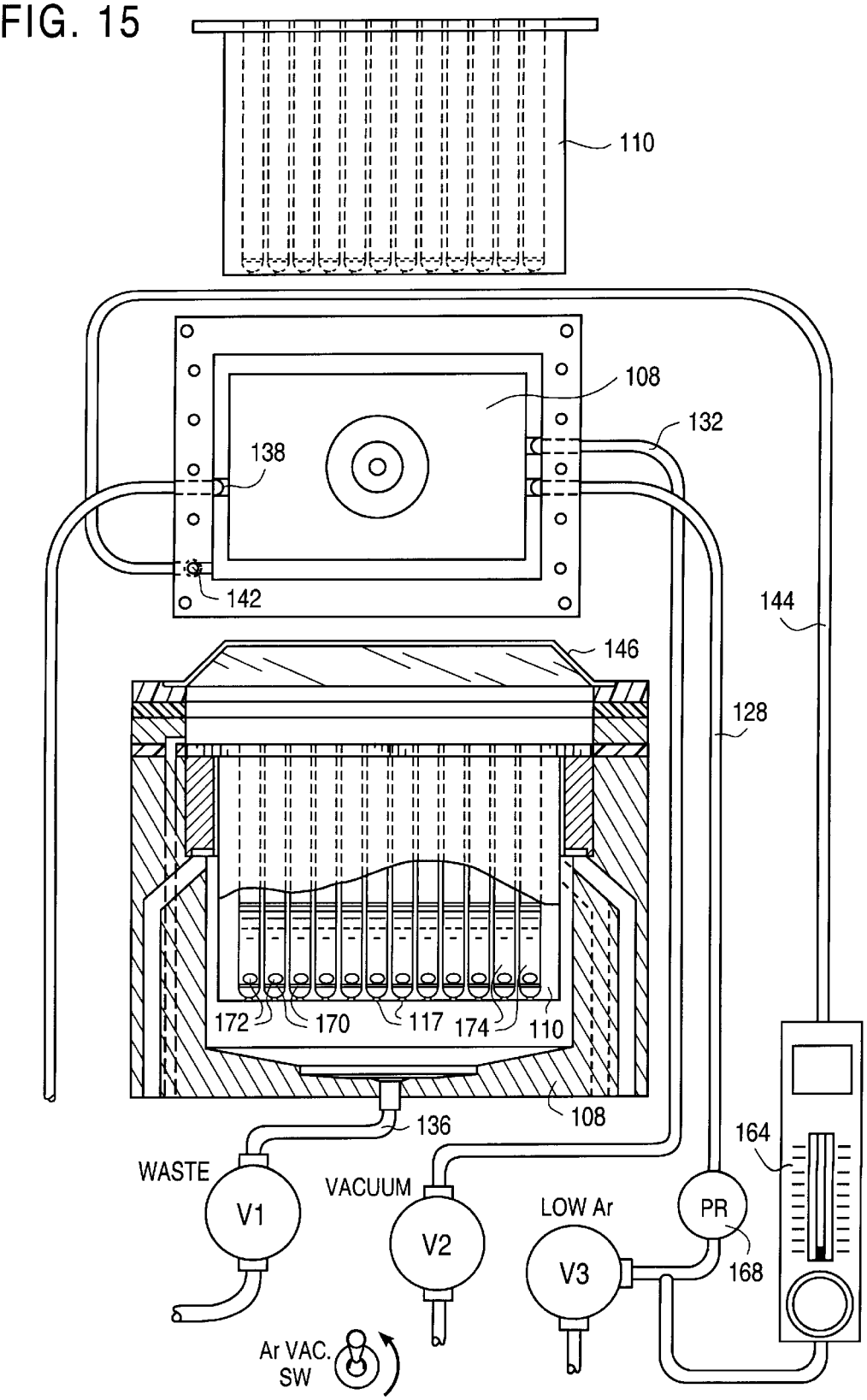
Figure 16:
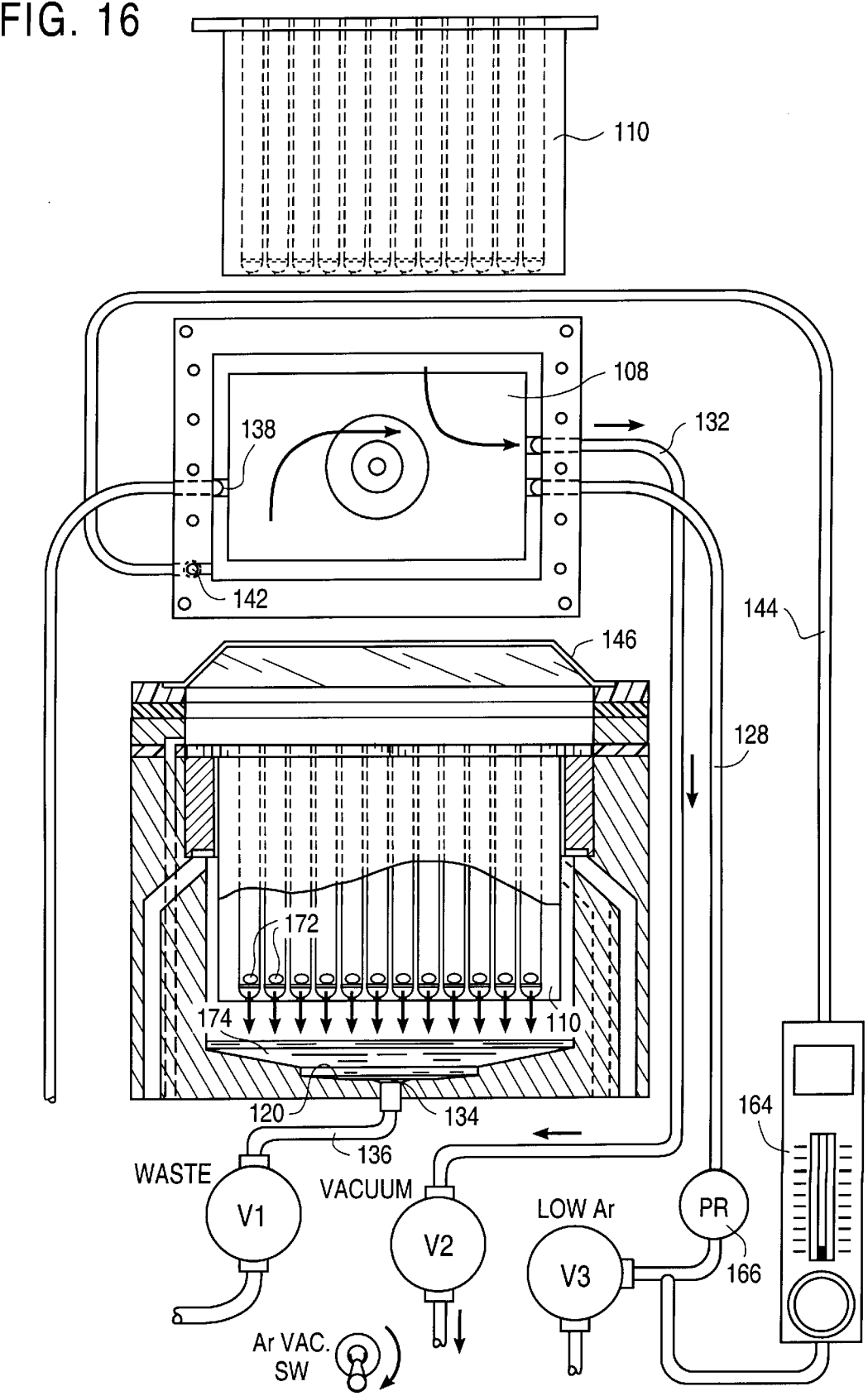

As illustrated in FIG. 15, various solid supports 172 are then introduced into reaction vessels 116 where they will rest upon frits 170. Various reagents 174 are then introduced into each of reaction vessels 116, with the reagents being held within reaction vessels 116 by application of positive pressure through line 128.

After reagents 174 have been maintained within reaction vessels 116 for an appropriate time period, valve V3 is closed and valve V2 is opened to create a vacuum within line 132 (by placement of switch 160 in the middle position). In turn, a vacuum is created within the manifold to draw the reagents 174 through apertures 117. The reagents drained from reaction vessels 116 enter into tapered bottom end 120 of base member 108 as shown. Placement of opening 130 vertically above bottom end 120 is advantageous in that the accumulated reagent 174 within bottom end 120 will not interfere with the vacuum required to drain reaction vessels 116.

Figure 17:
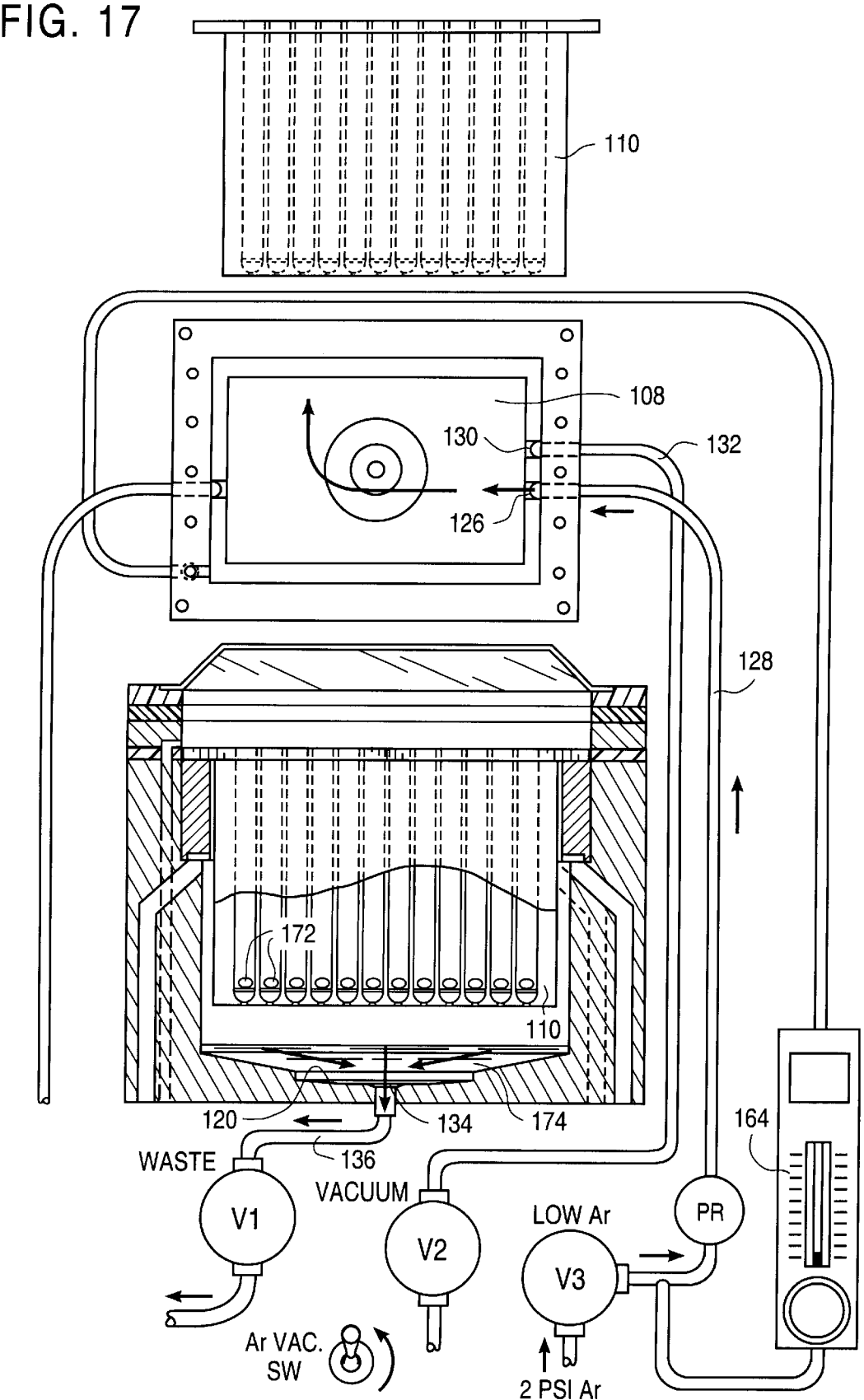

As illustrated in FIG. 17, once reaction vessels 116 have been sufficiently drained, valve V2 is closed and valve V1 is opened (by placement of switch 160 in the down position) to drain the accumulated waste reagents 174 within bottom end 120 through opening 134 and into line 136 as illustrated by the arrows. To assist in the draining process, valve V3 is preferably opened to supply argon gas into the manifold. In summary, draining of reagents 174 from chemical synthesizer 100 employs a two-step process. Initially, the reagents are drained from reaction vessels 116 into bottom end 120 by opening valve V2. The accumulated reagents within bottom end 120 are then removed from base member 108 by opening valve V1.

The process of adding and removing reagents may be repeated as many times as necessary to complete the synthesizing process. Introduction of the various reagents will preferably be accomplished by removing cover 146 and distributing the reagents within reaction vessels 116 using a multi-channel pipette. Following introduction of the reagents, cover 146 will preferably be replaced so as to preserve a generally inert atmosphere within synthesizer 100.

Figure 18:
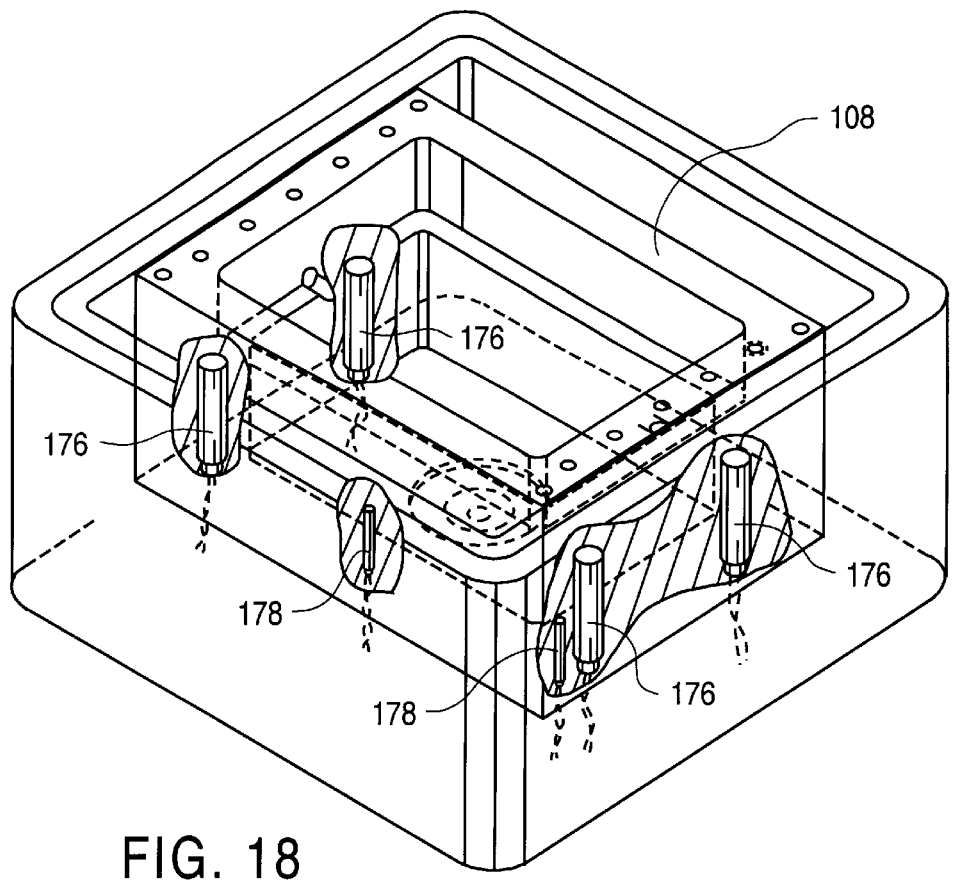
FIG. 18 is a partial cut-away view of the reaction chamber of the synthesizer of FIG. 9 illustrating various heating elements and sensors.

Referring now to FIG. 18, the process of heating reaction block 110 will be described in greater detail. Embedded within base member 108 are a plurality of heating elements 176 which are employed to heat base member 108 when actuated. Preferably, heating elements 176 comprise electrical resistance heaters which heat base member 108 when electrical current is supplied to the heaters. Since reaction block 110 is in direct contact with base member 108 (see FIG. 10) heat will be directly transferred from base member 108 to reaction block 110. Further, portions of reaction block 110 which are not in contact with base member 108 are sufficiently close so that heat radiated from base member 108 will further assist in the heating of reaction block 110. Heating elements 176 are spaced equally around base member 108 so that a generally uniform heating of base member 108 will occur.

Also embedded within base member 108 are a pair of thermocouples 178 to monitor the temperature of base member 108. Thermocouples 178 may be positioned at selective locations around base 108 and used to help ensure that a generally constant temperature is maintained throughout base member 108.

Figure 19:
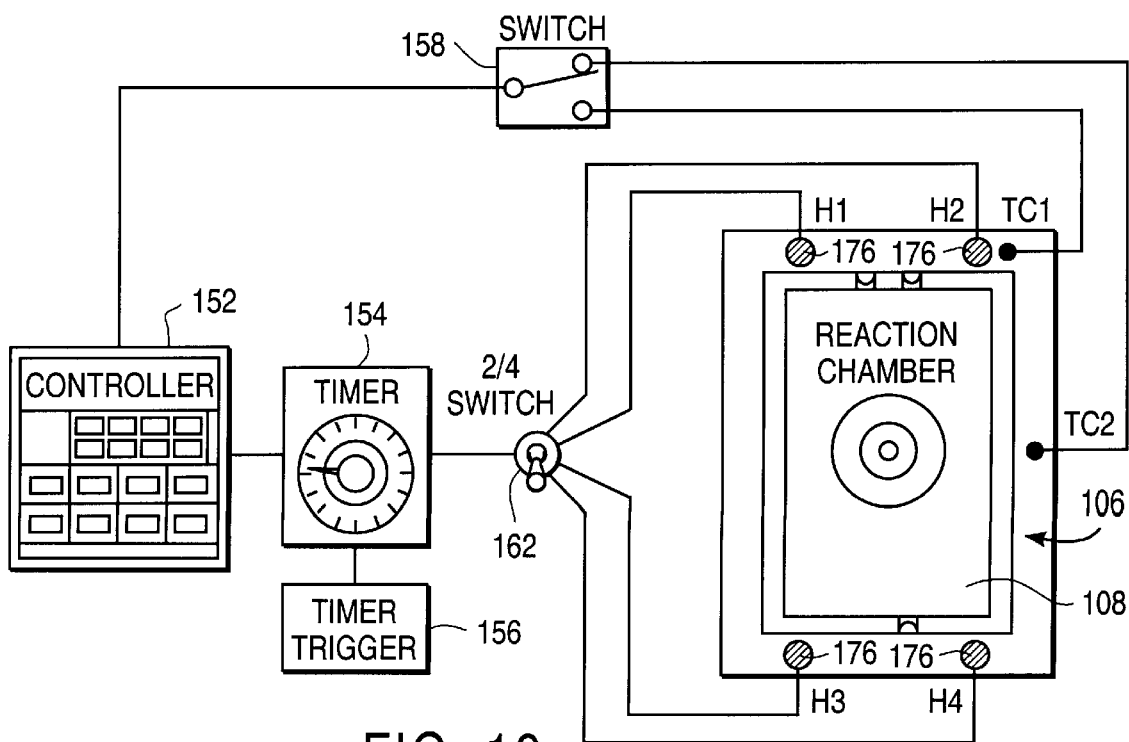
FIG. 19 illustrates the circuitry used in connection with the heating elements and sensors of FIG. 18.

Referring now to FIG. 19, a process for heating and for monitoring the temperature of base member 108 will be described. Initially, a user will select a desired temperature using controller 152 and will set the time for which this temperature is to be applied using timer 154. When ready to proceed, timer switch 156 is actuated and switch 160 (see FIG. 13) is turned to the up or "argon" position. Switch 162 may be appropriately toggled depending on whether the user wishes to employ the use of two of heating elements 176 or all four. Thermocouple switch 158 may also be toggled to select the particular thermocouple 178 that the user wishes to employ to monitor the temperature of base member 108. During the heating process, controller 152 maintains base member 108 within a desired temperature range based on information received from thermocouples 178. Heating elements 176 will preferably be employed to heat reaction block 110 to a temperature in the range from about 20 degrees C. to about 200 degrees C. Base member 108 will preferably be maintained within the desired temperature range until timer 154 expires, whereupon controller 152 will turn off heating elements 176. In an alternative aspect, positive temperature control 152 may be employed to vary the temperature of base member 108 over time. In this way, reagents 174 may be subjected to varying temperatures throughout the synthesizing process.

Figure 20:
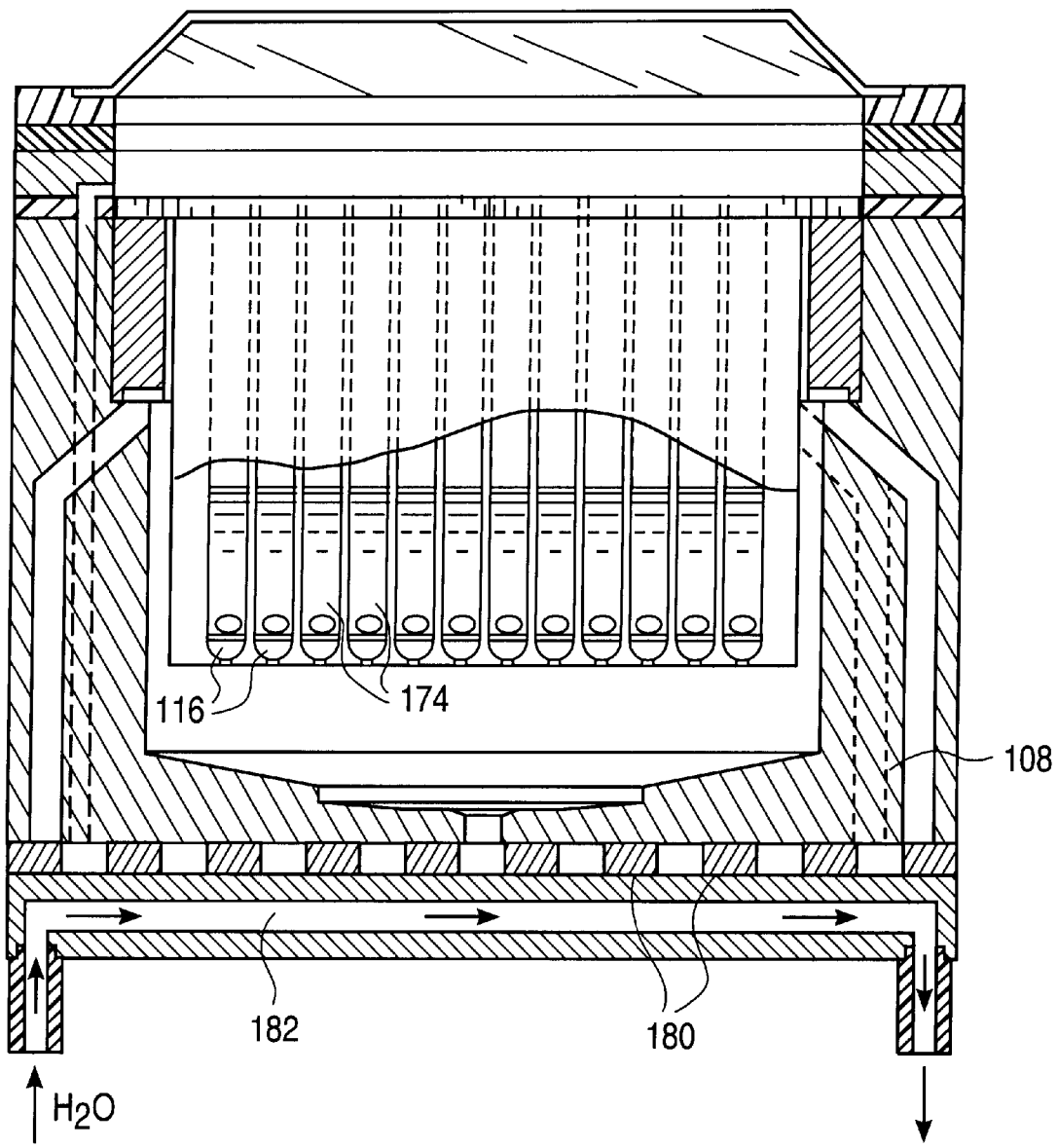
FIG. 20 is a cross-sectional side view of the reaction chamber of the synthesizer of FIG. 9 illustrating a method for cooling the reaction chamber using Peltier devices and a coolant.

Referring now to FIG. 20, chemical synthesizer 100 will be described in connection with a cooling system which is employed to cool reaction block 110 during a synthesizing process. In this embodiment, a plurality of Peltier crystals 180 are provided at the bottom of base member 108. As electrical current is passed through crystals 180, heat is removed from base member 108 to lower its temperature. Through both conductive and radiation heat transfer, reaction block 110 is then cooled, thereby cooling reagents 174 within reaction vessels 116. To remove heat from Peltier crystals 180, a coolant, such as water, is circulated through a pipe 182 which is adjacent crystals 180 as shown. A negative temperature controller (not shown) which is similar to controller 152 may be employed to control the temperature at which base member 108 is maintained. Preferably, use of crystals 180 will allow base member 108 to be cooled to a temperature in the range from about 20 degrees C. to about −20 degrees C.

Figure 21:
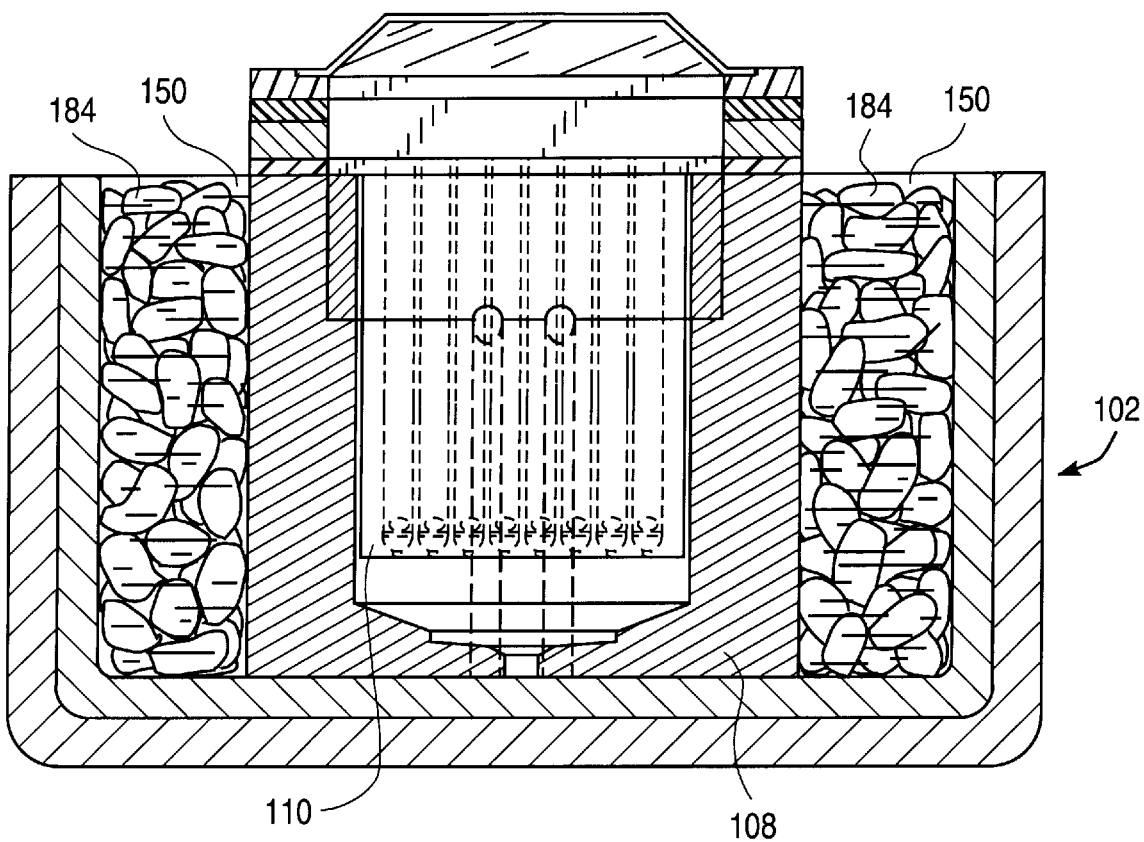
FIG. 21 is a cross-sectional side view of the reaction chamber of the synthesizer of FIG. 9 having a supply of dry ice to cool the reaction chamber.

To lower the temperature of reaction block 110 below about minus −20 degrees C., regions 150 may be filled with a coolant 184, such as dry ice, as illustrated in FIG. 21. Coolant 184 is in direct contact with base member 108 to allow base member 108 to be cooled to approximately the temperature of the coolant 184, preferably to temperatures as low as −100 degrees C.

Hence, chemical synthesizer 100 is advantageous in that it employs a relatively small number of valves to both maintain fluids within a large number of reaction vessels and to drain the fluids when needed. Preferably, reaction block 110 will include 96 reaction vessels 116 which are arranged in a standard 96-well format so that commercially available processing and handling equipment may be employed. Another advantage of chemical synthesizer 100 is that heat may be selectively added to or removed from the reaction block so that the synthesizing process may take place within a wide range of temperatures. Still another advantage is the relatively small size of chemical synthesizer 100 which allows the reaction chamber to be sealed from the outside environment. In this way, an inert atmosphere is provided to protect the various chemicals and reagents as well as providing a non-flammable environment.

Figure 22:
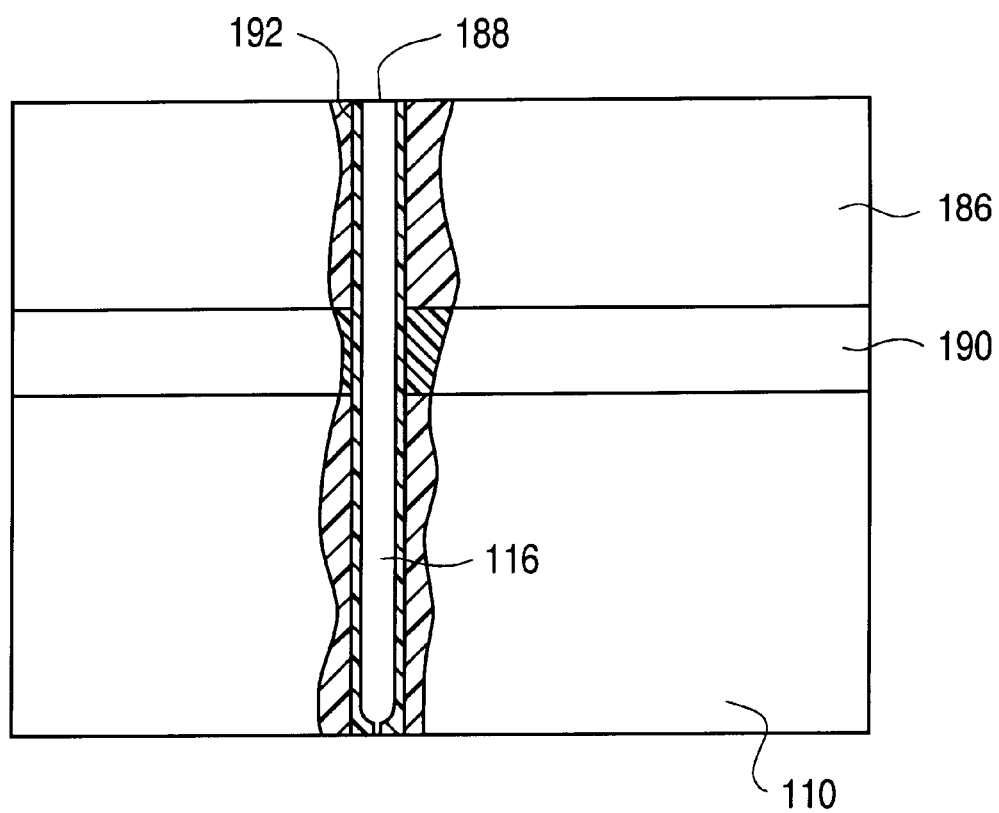
FIG. 22 is a cut-away side view of an atlernative reaction block having a condenser according to the invention.

Referring now to FIG. 22, an alternative arrangement of reaction block 110 will be described. In the embodiment of FIG. 22, reaction block 110 further includes a condenser 186 for condensing and collecting various liquids during the synthesizing process. Condenser 186 is arranged to be placed on top of reaction block 110 so that the combined structure may be placed within chemical synthesizer 100 and operated in a manner similar to the previously described.

Condenser 186 comprises a plurality of collection chambers 188 (only one being shown for convenience of illustration) which correspond in number and arrangement to reaction vessels 116. In this way, as liquids boil within reaction vessels 116 the rising steam will be collected and condensed within collection chambers 188.

One particular feature of collection chambers 188 is the manner in which they are integrated with reaction vessels 116. Construction of reaction block 110 and condenser 186 will preferably be accomplished by placing a polytetrafluoroethylene layer 190 between condenser 186 and reaction block 110. Layer 190 will preferably include apertures which correspond with collection chambers 188 and reaction vessels 116. A solid polytetrafluoroethylene plug will then be inserted through condenser 186, layer 190 and into reaction block 110 for each collection chamber 188 and reaction vessel 116. A hole will then be drilled through the plug to form a liner 192 which extends through condenser 186, layer 190 and reaction block 110 as shown. In this way, reaction vessels 116 and collection chambers 188 will be aligned with each other and will be lined with a common liner. Furthermore, such a liner will be constructed of polytetrafluoroethylene to prevent various resins from sticking to the sides of the vessels. Once formed, a frit may be placed in the bottom of the reaction vessels 116 so that solid supports may be placed into the reaction vessels similar to that previously described.

The invention has now been described in detail. However, it will be appreciated that certain changes and modifications may be made. Therefore, the scope and content of this invention are not limited by the foregoing description. Rather, the scope and content are to be defined by the following claims.

What is claimed is:

1. A method for synthesizing compounds, the method comprising:

providing a reaction block having a top end, a bottom end, and a plurality of reaction chambers between the top end and the bottom end;

placing the reaction block within a housing having a base and a plurality of side walls that define an interior;

introducing a plurality of solid supports into the reaction chambers;

applying positive pressure within the housing with an inert gas to produce positive pressure at the bottom end of the reaction block;

introducing at least one reagent into the reaction chambers, wherein the reagent is held within the reaction chambers by application of the positive pressure; and altering the temperature of the reaction block to bring the reaction block within a desired temperature range by heating or cooling the interior into which the reaction block is disposed with at least one heat transfer device that is coupled to the walls and/or the base of the housing.

2. A method as in claim 1, further comprising periodically varying the temperature of the reaction block while the reagents are within the reaction vessels.

3. A method as in claim 1, wherein the heat transfer device comprises an electrical heating element that is disposed within the walls of the housing, and further comprising adding heat to the reaction block by supplying current to the heating element to heat the block to a temperature within the range from about 20 degrees C. to about 200 degrees C.

4. A method as in claim 1, further comprising removing heat from the reaction block by placing a frozen substance into the housing to cool the block to a temperature within the range from about 20 degrees C. to about −100 degrees C.

5. A method as in claim 1, wherein the heat transfer device comprises a Peltier device, and further comprising removing heat from the reaction block by supplying current to the Peltier device to cool the block to a temperature within the range from about 20 degrees C. to about −20 degrees C.

6. A method as in claim 1, further comprising ceasing application of the positive pressure and draining the reagent from the bottom end of the reaction block.

7. A method as in claim 6, wherein the draining step comprises applying negative pressure to the bottom end.

8. A method as in claim 7, further comprising draining the reagent into a tapered manifold.

9. A method as in claim 8, further comprising removing the reagent from the manifold by application of negative pressure to the manifold.

10. A method as in claim 1, wherein a frit is disposed in at least some of the reaction chambers, and further comprising placing the solid supports onto the frits.

11. A method as in claim 1, further comprising producing a blanket of an inert gas over the top end.

12. A method as in claim 1, further comprising enclosing the reaction block from the outside environment.

13. A method as in claim 1, further comprising monitoring the pressure applied to the bottom end.

14. A method for synthesizing compounds, the method comprising:

providing a reaction block having a top end, a bottom end, and a plurality of reaction chambers between the top end and the bottom end;

placing the reaction block within a housing having a base, a plurality of side walls that define an interior, and a plurality of heating elements disposed in the side walls;

introducing a plurality of solid supports into the reaction chambers;

applying positive pressure within the housing with an inert gas to produce positive pressure at the bottom end of the reaction block;

introducing at least one reagent into the reaction chambers, wherein the reagent is held within the reaction chambers by application of the positive pressure; and supplying current to the heating elements to heat the interior and to bring the temperature of the reaction block within a desired temperature range.

15. A method for synthesizing compounds, the method comprising:

providing a reaction block having a top end, a bottom end, and a plurality of reaction chambers between the top end and the bottom end;

placing the reaction block within a housing having a base and a plurality of side walls that define an interior, wherein a plurality of Peltier devices are coupled to the housing so as to be within the interior;

introducing a plurality of solid supports into the reaction chambers;

applying positive pressure within the housing with an inert gas to produce positive pressure at the bottom end of the reaction block;

introducing at least one reagent into the reaction chambers, wherein the reagent is held within the reaction chambers by application of the positive pressure; and supplying current to the Peltier devices to cool the interior and to bring the temperature of the reaction block within a desired temperature range.

16. A method as in claim 15, further comprising flowing a liquid past the Peltier devices to transfer heat from the Peltier devices.

17. A method as in claim 15, further comprising placing a frozen substance within the interior.

* * * * *